US008201216B2

(12) United States Patent
Cha et al.

(10) Patent No.: US 8,201,216 B2
(45) Date of Patent: Jun. 12, 2012

(54) TECHNIQUES FOR DATABASE STRUCTURE AND MANAGEMENT

(75) Inventors: Inhyok Cha, Yardley, PA (US); Debashish Purkayastha, Pottstown, PA (US); Richard D. Herschaft, Whitestone, NY (US); Yogendra C. Shah, Exton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1140 days.

(21) Appl. No.: 11/854,265

(22) Filed: Sep. 12, 2007

(65) Prior Publication Data

US 2008/0189250 A1 Aug. 7, 2008

Related U.S. Application Data

(60) Provisional application No. 60/843,891, filed on Sep. 11, 2006, provisional application No. 60/829,020, filed on Oct. 11, 2006, provisional application No. 60/912,025, filed on Apr. 16, 2007.

(51) Int. Cl.
*G06F 21/22* (2006.01)
*G06F 12/14* (2006.01)
*G06F 17/30* (2006.01)

(52) U.S. Cl. .................... 726/2; 726/1; 726/27; 707/708

(58) Field of Classification Search ........................ None
See application file for complete search history.

(56) References Cited

U.S. PATENT DOCUMENTS 6,779,120 B1 * 8/2004 Valente et al. .................... 726/1
6,915,297 B2 * 7/2005 Chou .................................... 1/1
7,917,501 B2 * 3/2011 Arends et al. ................. 707/718
7,966,644 B2 * 6/2011 Noda et al. ........................ 726/1
2002/0144119 A1 10/2002 Benantar
2005/0021975 A1 1/2005 Liu
2005/0044089 A1 * 2/2005 Wu et al. ....................... 707/100
2005/0049993 A1 * 3/2005 Nori et al. ........................ 707/1
2005/0049994 A1 * 3/2005 Thompson et al. ............... 707/1
2005/0050053 A1 * 3/2005 Thompson .................... 707/100

(Continued)

FOREIGN PATENT DOCUMENTS

WO WO 2005/015422 A1 2/2005

OTHER PUBLICATIONS

Liberty Alliance Project, "Liberty ID-FF 1.2 Errata", Version 1.0, (2004).

(Continued)

*Primary Examiner* — Christopher Revak

(74) *Attorney, Agent, or Firm* — Woodcock Washburn LLP

(57) ABSTRACT

An embodiment is related to a database system for protecting data privacy and efficient organization of data. An enhanced database system comprises a DBMS, a data classifier, a database of applications and a rules and policy unit. The DBMS includes a query processor for processing a query from a user. The rules and policy unit outputs a pointer to a node within the data classification tree based on several criteria. In accordance with another embodiment, a DBMS residing within a communication network organizes data related to the ID of mobile users. In accordance with another embodiment, an enhanced database system comprises a DRM user agent and a DBMS. The DRM user agent receives a CO protected by DRM. The DBMS stores the CO and controls access to the CO based on restrictions specified in an RO associated with the CO.

20 Claims, 10 Drawing Sheets

U.S. PATENT DOCUMENTS

| | | | | |
|---|---|---|---|---|
| 2005/0050054 | A1 * | 3/2005 | Clark et al. | 707/100 |
| 2005/0050537 | A1 * | 3/2005 | Thompson et al. | 717/165 |
| 2005/0055354 | A1 * | 3/2005 | Thompson et al. | 707/100 |
| 2005/0144450 | A1 | 6/2005 | Voice | |
| 2005/0203921 | A1 * | 9/2005 | Newman et al. | 707/100 |
| 2006/0041933 | A1 | 2/2006 | Yakov | |
| 2006/0075224 | A1 | 4/2006 | Tao | |
| 2006/0218643 | A1 * | 9/2006 | DeYoung | 726/26 |
| 2007/0266256 | A1 | 11/2007 | Shah et al. | |
| 2009/0260051 | A1 * | 10/2009 | Igakura | 726/1 |

OTHER PUBLICATIONS

Liberty Alliance Project, "Liberty ID-WSF 2.0 Marketing Requirements Document", Version 1.0, (2006).

Liberty Alliance Project, "Liberty Technology Tutorial", Teleconference, (Presented Mar. 1, 2006).

M-Tech Information Technology, Inc., "Integrating Password Synchronization, Reset and Enterprise Single Signon (SSO)", Retrieved from http://psynch.com/docs/integrating-password-manaqement-with-single-signon.html, (Last visited Feb. 6, 2008).

OASIS, "Authentication Context for the OASIS Security Assertion Markup Language (SAM:) V2.0", OASIS Standard, (Mar. 15, 2005).

Trusted Computing Group, "TCG Mobile Trusted Module Specification", Specification Version 1.0 Revision 1, (Jun. 12, 2007).

Trusted Computing Group, "TCG Specification Architecture Overview", Specification Revision 1.2, (Apr. 28, 2004).

Trusted Computing Group, "TPM Main Part 1 Design Principles", Specification Version 1.2 Revision 85, (Feb. 13, 2005).

Wikipedia, "Web Scraping", Retrieved from http://en.wikipedia.org/wiki/Web_scraping, (Last updated Jan. 8, 2008, Last visited Feb. 6, 2008).

M-Tech Information Technology, Inc., "Integrated Password Synchronization, Reset and Enterprise Single Signon (SSO)", Retrieved from http://psynch.com/docs/integrating-password-management-with-single-signon.html, (Last visited Feb. 6, 2008).

Pashalidis et al., "Single Sign-On Using Trusted Platforms," pp. 54-68, XP019030992 (Dec. 10, 2003).

Pashalidis et al., "Single Sign-On Using Trusted Platforms", Royal Holloway, University of London, 6th Information Security Conference Oct. 1-3, 2003, European Research Laboratories of Hewlett-Packard in Bristol, United Kingdom, 54-68.

Hillenbrand et al., "A Single Sign-On Framework for Web-Services-based Distributed Applications", Proceedings of the 8th International Conference on Telecommunications, ConTEL 2005, Jun. 15-17, 2005, 273-279.

Pashalidis, "Interdomain User Authentication and Privacy", Technical Report, RHUL-MA-2005-13, Dec. 23, 2005, 84 pages.

Schmidt et al., "Efficient Application SSO for Evolved Mobile Networks", Wireless World Research Forum Meeting, Sep. 1-6, 2010.

Yamazaki et al., "Proposal of Extended Kerberos Protocol for Secure Biometrics Authentication", Report of Technical Study of Electronics, Information and Communication Engineers IEICE Technical Report, The Institute of Electronics, Information and Communication Engineers, Japan, Feb. 23, 2006, 105(628), 453-458.

Japanese Patent Applicaation No. 2009-525636. Official Notice of Rejection mailed on Sep. 22, 2011.

* cited by examiner

| NAME | TEL. NO. | STREET | CITY | STATE |
|---|---|---|---|---|
| A | 123 | X | y | PA |
| B | 456 | T | n | NY |
| C | 789 | H | m | PA |

A CENSUS APPLICATION TRYING TO FIND PEOPLE WHO LIVES IN STATE PA.
TYPICAL SQL QUERY: SELECT FROM NAME, WHERE (STATE = PA) WILL RETURN,

THE EXTRA INFORMATION DISCLOSED COMPROMISES PRIVACY. THIS HAPPENS DUE TO INAPPROPRIATE SCHEMA DESIGN BY THE DEVELOPERS.

| NAME | TEL. NO. | STREET | CITY | STATE |
|---|---|---|---|---|
| A | 123 | X | y | PA |
| C | 789 | H | m | PA |

*FIG. 1a*
PRIOR ART

| NAME | TEL. NO. | STREET | CITY | STATE |
|---|---|---|---|---|
| A | 123 | X | y | PA |
| C | 789 | H | m | PA |

SUPPRESS

| NAME | STATE |
|---|---|
| A | PA |
| C | PA |

*FIG. 1b*
PRIOR ART

TECHNIQUES FOR DATABASE STRUCTURE AND MANAGEMENT

CROSS REFERENCE TO RELATED APPLICATIONS

This application claims the benefit of U.S. provisional application No. 60/843,891 filed on Sep. 11, 2006, U.S. Provisional Application No. 60/829,020 filed on Oct. 11, 2006 and U.S. Provisional Application No. 60/912,025 filed on Apr. 16, 2007 which are incorporated by reference as if fully set forth.

FIELD OF INVENTION

The present invention is related to wireless communication systems. More particularly, a database management systems within a wireless communication system is disclosed.

BACKGROUND

In a converged network, user data flow occurs continuously with minimal impedance. Enhanced services will demand exchange of user data among different users and service providers. User data is exchanged in a transaction via a query response paradigm. Due to present database design and query language constructs, in most of the cases, databases disclose more information than required from the context of the query.

When a query for user data is received, a database is queried and, depending on the keyword, retrieves a record and discloses information to the requester. The queried database can be a local database query, a query received over the Internet, a query issued by a web crawler or an automated agent querying on behalf of an end user, and queries issued by human or automated agents querying on behalf of network operators, application service providers, or other providers of services. By disclosing the complete record based on a keyword, the privacy of the end user is compromised. For example, a record of user data indexed by name contains street address, city and state. Suppose that a particular application needs to find out in which state the user lives. A query on this user record would typically return the entire address. This may happen because the developer of the database designed schema in such a way that any query on an address returns the whole address schema. Disclosing the street address and city information may be a breach of privacy from the user's perspective.

It is common for organizations to release personal data with explicit identifiers, (such as name, address and telephone number), removed on the assumption that anonymity is maintained because the data looks anonymous. FIG. 1*a* shows a data set for names A, B, C. FIG. 1*b* shows a suppression method to exclude sensitive information in the data set. However, in most of these cases, data can be used to re-identify individuals by linking or matching the data to other data, or by looking at unique characteristics found in the released data as shown in FIG. 2. To overcome the problem of linking publicly available data to re-identify the data, generalization techniques are used. Generalization makes released data ambiguous so that it cannot be linked to other data available in the public domain.

A hippocratic database tags data with the purpose for which it is collected. The "purpose" is part of the data schema. A query on such a database needs to specify the purpose. If there is a match between the purpose of the query and purpose of the data record then only the data is returned. Thus, defining purpose and matching with query can restrict disclosure of information. The user can consent about the purpose of data collection or restrict it. However, in a hippocratic database, collecting and properly tagging the data record with purpose is not always accurate. It may not scale properly in case of user data which is stored in different nodes and in different formats.

Binning methods of data partitioning may be used to classify data in common buckets. The binning is done on entire database records, mostly classifying data based on functional roles. As a result, the binning method of data partitioning loses the usefulness of data. It treats the whole database and partitions in common bins or buckets as it does not consider user data. User data may exist in different format and structure, and for every format and structure data needs to be binned again. The binning method is not interoperable with different systems and database management systems.

The method of field level privacy in databases lets a user see certain rows or columns, (e.g., 5 rows from a table of 10 rows×10 columns). This is known as a method of "suppression" or "restriction". Users have a restricted access to certain portions of the table. This restriction is implemented by providing users certain "privilege labels" and marking the rows or the table with the same "privilege label". the most simple scenario, when a SQL query finds a match between a user label and the label by which the row was marked, the data is retrieved. Such a method resembles the existing role based access control (RBAC) model. The method of field level privacy, although used extensively, has several disadvantages. By pre-assigning user privileges and marking rows and columns with labels, a static relationship is created. Only the user's predefined role is considered for access. Other contextual information, such as the kind of application making the request and what is generally done with the data, is not considered. Besides suppression, generalization also helps in improving privacy. The field level technique does not provide generalization. By only using the suppression method, there is a chance of privacy breach by such methods as correlation, extrapolation, or the like. By generalizing, the chances of correlations are reduced.

In another prior art model known as translucent databases, hashing is extended in new and important ways. Translucent databases can be used for mapping certain information, for example crime trends, where the first column is the hash of the person's name, and the second column is a hash of their full address, and the third column is a hash of their block and street. Certain types of information, such as specific incidents, can be grouped together by grouping entries with identical block hashes. It can be determined if the incidents refer to the same person by checking to see if those hashes are different.

FIG. 3*a* shows building of the hierarchy of information elements. Using ontology (data description), the data classifier builds a hierarchy of information elements from the user data record. Taxonomy can be defined such that it partitions user data to a proper place in a hierarchical manner. For example, an address of a user can be arranged as a hierarchical tree by putting the country information at the highest level, the state information at the next level, then city and at the leaf node street address. Each node in the hierarchy can have attributes or properties. These properties indicate other identifying information that an entity, such as a person, has based on the location of the entity. By classifying data, information is abstracted at each node level.

Ontology and knowledge based systems (KBS) are useful where a semantic query attempts to help a user obtain or manipulate data in a database without knowing its detailed syntactic structure. Unlike syntactic queries, (e.g., SQL, XPath and XQuery queries), which only support retrieval of explicit data based on syntactic information (i.e., elements/documents structure), semantic queries enable retrieval of both explicitly and implicitly derived information based on syntactic and semantic information contained in the database. A user describes what information is needed without having detailed knowledge of how the information is actually represented. For example, in a semantic query, the query "list the name of all employees in the database" is equivalent to the syntactic query "list the name of all faculty, trainees and employees in the database", provided the database semantics specify that all faculty members and trainees are employees.

FIG. 3*b* shows examples of an ontology based classification. Ontologies with their queries can be considered a form of a database system. An example is the IBM ontology management system (also known as semantic network ontology base (SNOBASE)). Ontologies are often hierarchic with nodes having a parent/child relationship. An ontology can be effectively exploited to rewrite a user query into another query such that the new query provides additional meaningful results that satisfy the intention of the user. It does not consider privacy issues while disclosing data.

A second issue regarding the use of data in a converged network how to perform functions such as extraction, organization, processing, and transfer of data such that it can be obtained from, and transmitted to, different databases or applications securely and efficiently. A data base management system (DBMS) is a technology that is well-suited to some of these problems.

An example of the use of a database management system (DBMS) on a system that runs multiple applications and interacts with multiple data sources occurs in digital rights management (DRM). Such a DBMS can reside on a DRM server on the service provider's side, or on a user's device, such as a mobile device. In a typical scenario of DRM application on a user's device, the user's device may receive DRM protected data from a service provider. This data may have been generated for different DRM user agents, and may consist of varying items, and have differing permissions assigned. A user may want to access and use this disparate data in an organized manner. A DBMS is generally a technology that can store data in an organized way that allows for efficient access to data.

In the prior art, DRM systems and database management systems were integrated only to a limited degree, whereby DBMSs held information that was packaged into DRM rights objects (RO) and content objects (CO) prior to their distribution to a DRM user agent program at a user's device.

Prior systems, such as iTunes, organizes DRM content at a DRM user agent using a datastore that may have aspects of a database. Some DRM technology can generate DRM protected content that can be processed by different DRM rendering systems. For example, RealNetworks harmony technology allows a consumer to purchase a song that can be played on any device that uses Apple FairPlay DRM, Microsoft Windows Media Audio DRM, or RealNetworks Helix DRM.

However, DBMSs are not integrated to the degree where they are used to organize the foreseeable multitude of disparate DRM protected data on users' devices, nor to manipulate the data from such multitudes of disparate DRM systems in a unified manner. For example, data from multitudes of DRM systems is not organized in a way such that its use enables access to DRM protected content that can then be processed by the corresponding DRM user agent. The DRM user agents can currently organize content to a degree, but this is limited to content that is either wrapped in its own DRM protection technology, or content that is not DRM protected. DRM systems currently store data for the basic retrieval of the data based on context restrictions, e.g., user ID, time, location, but do not provide for the coordinated retrieval of data contained in different content objects.

With the convergence of wireless devices that can obtain different types of services from a variety of wireless and wire-line access technologies, it is becoming very important that network operators have database systems that can organize, manipulate and transfer various data related to the identification (ID) of a user. This data can be related to the type of devices that are used to obtain services, and the types and characteristics of services, tariffs, billing information, service providers, as well as information about security of the devices and services.

Although prior art techniques for utilizing DBMS exist, there is a need for DBMSs to organize databases in such a way as to handle new data from unknown sources across multiple access technologies and to transfer data to other DBMSs while assuring transportability and protection of privacy or other proprietary information.

SUMMARY

An embodiment is related to a database system for protecting data privacy and efficient organization of data. An enhanced database system comprises a DBMS, a data classifier, a database of applications and a rules and policy unit. The DBMS includes a query processor for processing a query from a user. The data classifier outputs a data classification for the query in a predetermined data classification tree which partitions user data in a hierarchical manner. The database of applications contains a description about applications. The rules and policy unit outputs a pointer to a node within the data classification tree based on several criteria.

In accordance with another embodiment, a DBMS residing within a communication network organizes data related to the ID of mobile users. This implementation of a DBMSs, called the ID-DBMSs, facilitates seamless and organic handovers of services and network accesses while protecting the ID of mobile users.

In accordance with another embodiment, an enhanced database system comprises a DRM user agent and a DBMS. The DRM user agent receives a CO protected by DRM. The DBMS stores the CO and controls access to the CO based on restrictions specified in an RO associated with the CO.

In accordance with yet another embodiment, an enhanced database system is coupled with a trusted processing module (TPM), or a separate cryptographic encryption/decryption processor that can encrypt/decrypt multiple different ciphering algorithms in order to securely and efficiently process, store and playback downloaded DRM COs.

BRIEF DESCRIPTION OF THE DRAWINGS

A more detailed understanding of the embodiments may be had from the following description of a preferred embodiment, given by way of example and to be understood in conjunction with the accompanying drawings wherein:

FIG. 1*a* is a data set of privacy information;

FIG. 1*b* is an illustration of suppression of a data set;

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 4:
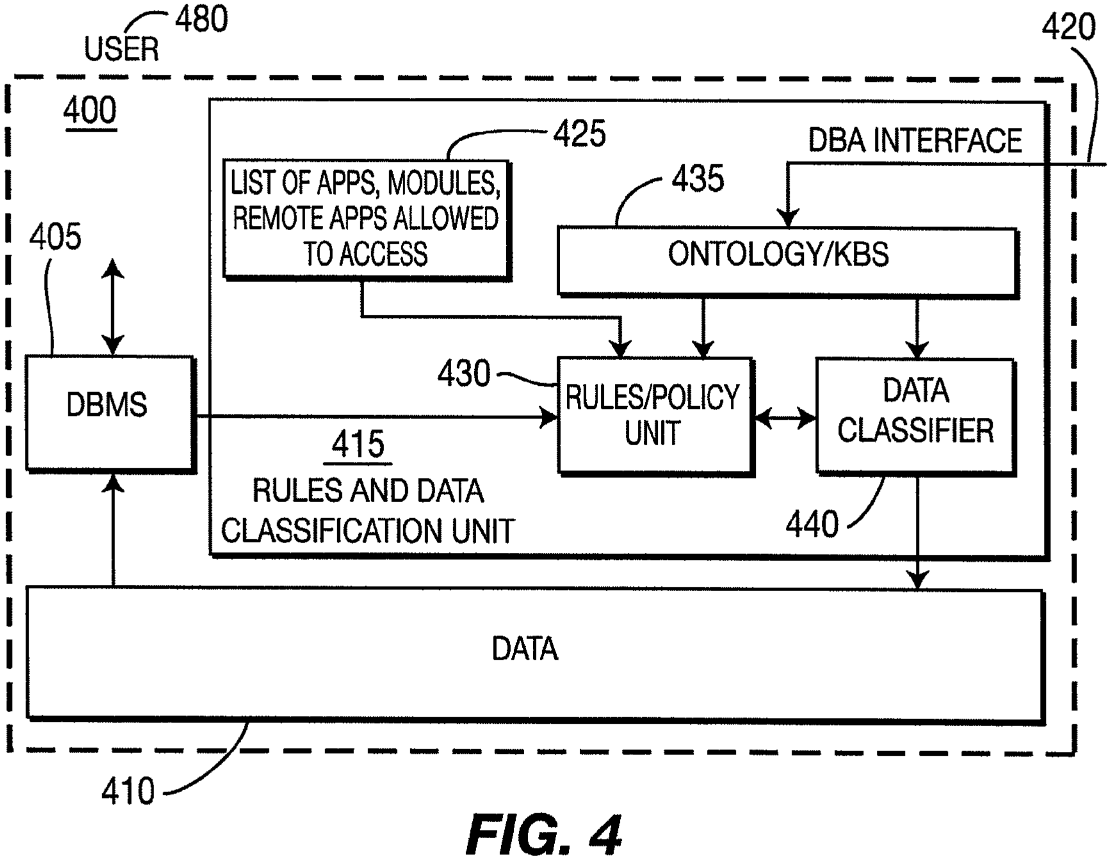
FIG. 4 is a block diagram of database system including a DBMS and a separate rules and classification unit.

FIG. 4 is an exemplary block diagram of embodiment of a database system 400. The database system 400 includes a DBMS 405, data 410, and a rules and data classification unit 415. The rules and data classification unit 415 includes a DBA interface 420, a list of applications 425 allowed to access the rules/policy unit 430, a rules/policy unit 430, an ontology/KBS classification unit 435, and a description data classifier 440.

The list of applications 425 contains information regarding applications and the purpose and usage of each. The list of applications 425 can be implemented using several methods. For example, any application which is installed in the system registers with the DBMS 405 by providing its functionality and possible use of data. The DBMS 405 might collect data about each query issued by an application and the kind of data being retrieved. This information is updated as it learns throughout its lifetime and builds the list of applications 425 allowed to access the rules/policy unit 430. The application information is made available to an operating system (not pictured) (OS). The list of applications 425 is protected by a TPM as defined in TCG. The rules/policy unit 430 retrieves the information. If it is unable to find the information then the request is denied.

Alternatively, the application information can be provided to the list of applications 425 as a software certificate, being certified (digitally signed) to perform certain functions. Software often consists of components and each component can be certified. These certificates can be stored securely as part of a TCG platform. Software can also be analyzed to determine its processing functions. Thus, based on the names of variables, names of fields on print-outs and monitor displays, as well as words in comment fields, the purpose of the application can be determined. Possibly the I/O can be of value. For example, a software component may have accepted requests from other programs to publish its results for use by these other programs.

As a third alternative, A DRM policy can exist to specify how user data may be used. For example, for an application to be allowed access to a database, must be run according to a DRM policy (the DRM "Execute" right). Thus although a DRM policy does not directly control access to the database, the DRM policy controlling the applications that access the database can be used to determine the "purpose" for the data access.

The rules/policy unit 430 works on the data classification generated by the data classifier 440. The rules/policy unit 430 gets input from the DBMS 405, including details about the query such as the application which has issued the query, and user credentials. The information about the application is used by the rules/policy unit 440 to obtain details regarding the usage and purpose of data from the list of applications 425 maintained by the system 400.

The rules/policy unit 430 uses rules to derive conclusions from premises. A rule can be thought of as an IF-THEN statement. For example, an IF application is of type "abc" and used for "xyz", and a THEN application provides information at Level(n1, n2, . . . ) of the classification tree. The left hand side is the predicate, precondition, or premises, and the right hand side has the conclusions or actions. The rules can be defined by any domain expert or a database administrator.

The ontology and KBS classification unit 435 provides an interface to describe or import ontology classification about user data. A database administrator can define the classification or it can be standard classification imported from a standards body. The ontology and KBS classification unit 435 also provides an interface for an administrator to provide the rules which are used by the rule/policy unit 430.

The data classifier 440 reads descriptions of user data and content, and then determines where these objects fit within a target taxonomy. There can be multiple taxonomic structures that can be applied to the same data. If there is difficulty in selecting a single appropriate structure then multiple structures can be used.

Figure 5:
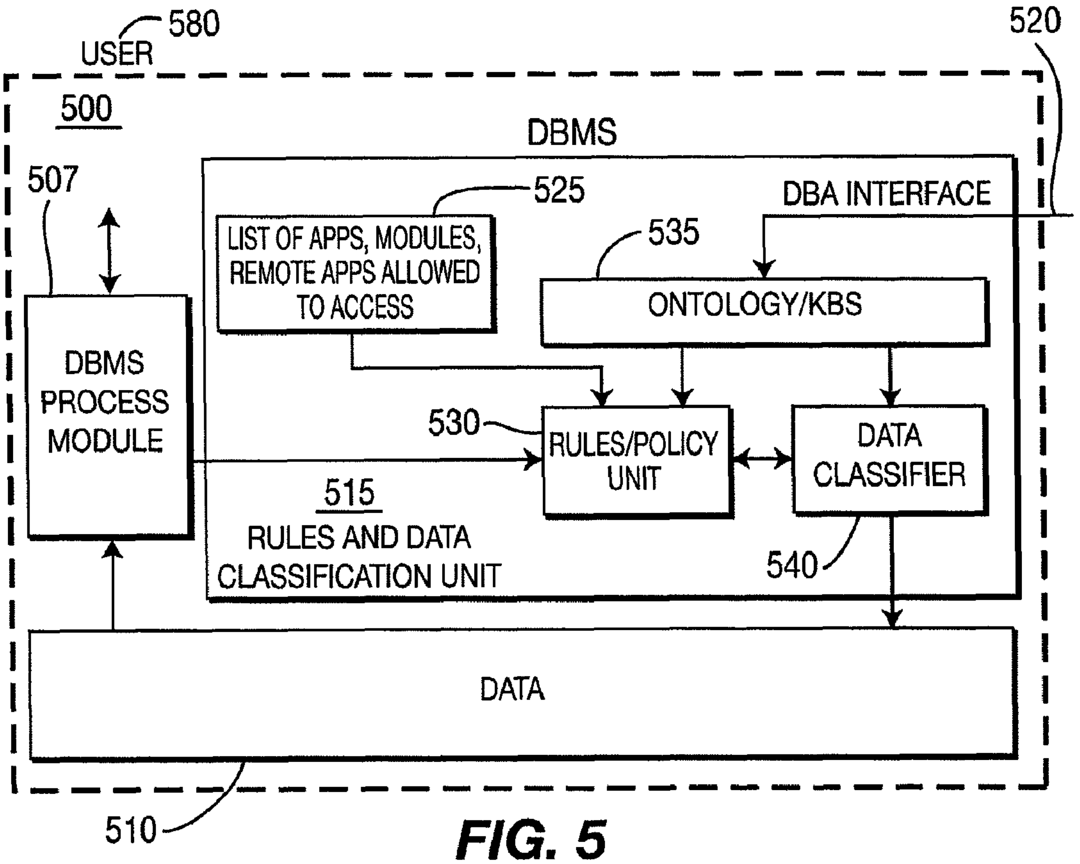
FIG. 5 is a block diagram of a database system in which the DBMS includes the rules and classification module.

FIG. 5 is an exemplary block diagram of an embodiment of a database system 500 in which a rules and data classification unit 515 is included in a DBMS 505. The database system 500 includes a DBMS 505, and data 510. The DBMS 505 includes a data base process module 507 and a rules and data classification unit 515. The rules and data classification unit 515 includes a DBA interface 520, a list of applications 525 allowed to access a rules/policy unit 530, an ontology/KBS classification unit 535, and a description data classifier 540.

Figure 6:
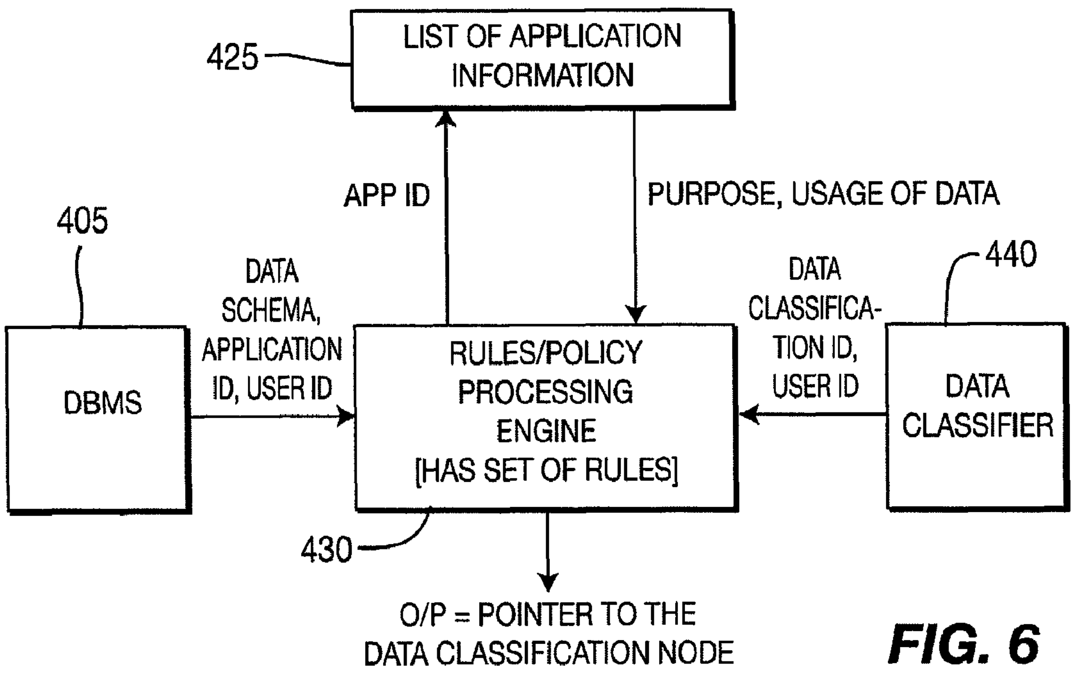
FIG. 6 shows inputs and outputs of the rules/policy unit.

FIG. 6 shows inputs and outputs of the rules/policy unit 430. The inputs include inputs from the DMBS 405, the list of applications 425, and the data classifier 440. The outputs of the rules/policy unit 705 are pointers to the nodes of the data classification tree. The node in the data classification links to the actual data in the data store. The data pointed by the node of the data classification are returned to the application which triggered the query through the DBMS 405.

The rules/policy unit 430 is explained in detail hereinafter. The rules/policy unit 430 contains IF-THEN rules that stand alone until the runtime system determines how the rules should be executed. The control flow is chosen by the runtime system. A rules-based, data-driven (data classification based on ontology) data management application is a two-pronged solution. The "data-driven" component operates against specific data residing in the database without requiring changes to the core application software. The rules/policy unit 430 can process any privacy related rule based on specified templates or rules. If the definition of the rules can be extended to users, it will only be extended to the extent that a user may further limit existing rules. The rules/policy unit 430 is also useful where the security/privacy policy and the logic to disclose data is too complex or dynamic to be managed at the source code level. For example, where a change in a security policy needs to be immediately reflected in the application, the rules/policy unit 430 provides the ability to modulate the communication schema without any change of application code.

Figure 2:
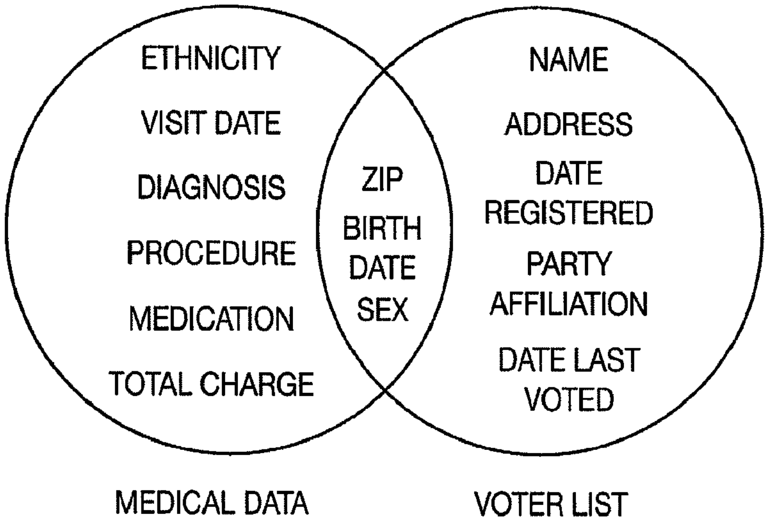
FIG. 2 illustrates linking publicly available data to re-identify data.
Figure 3A:
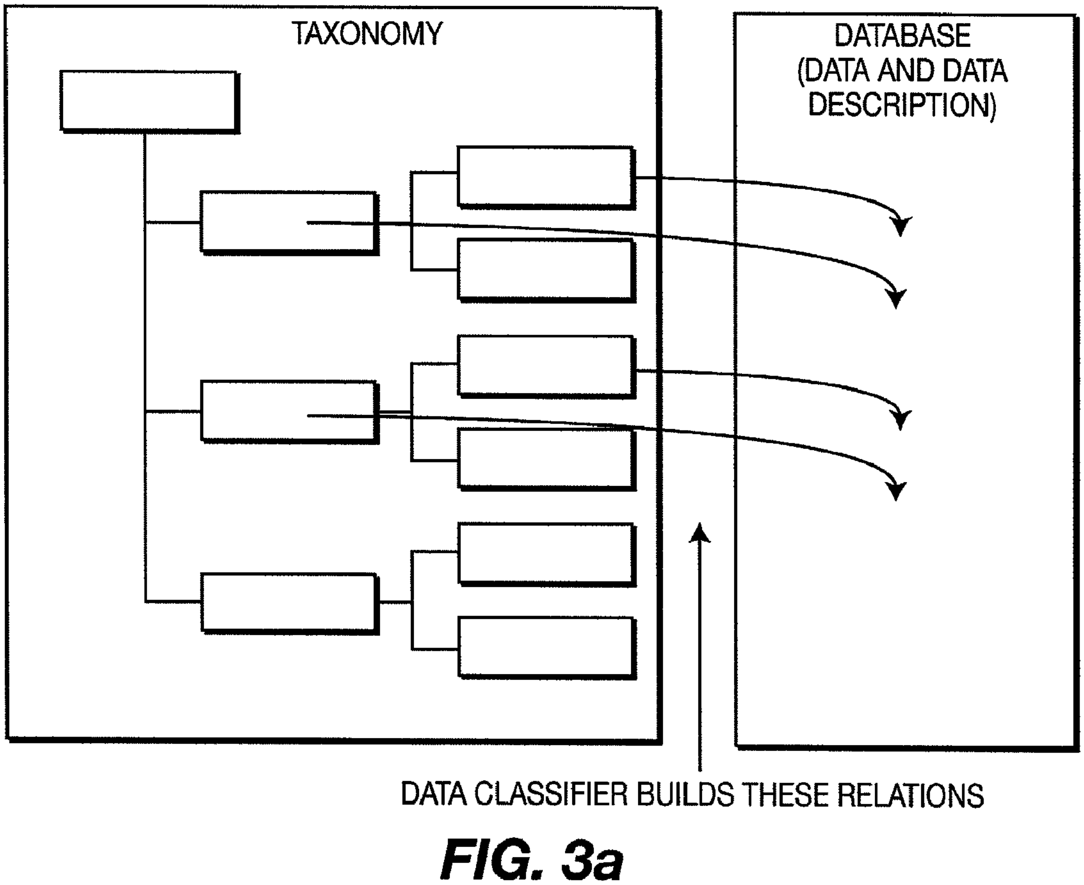
FIG. 3*a* illustrates building of the hierarchy of information elements.
Figure 3B:
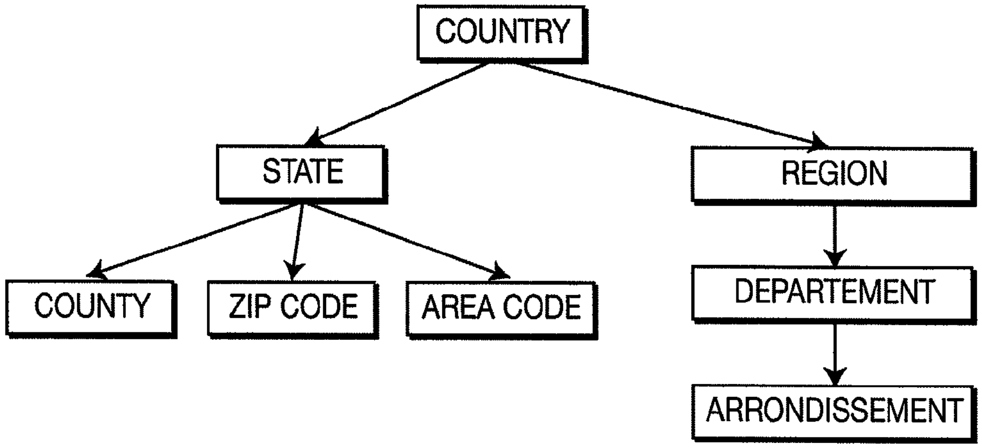
FIG. 3*b* is an example of ontology based classification.

It may be that different branches of a taxonomy hierarchy have different access rules. For instance, in FIG. 3*a*, the branch starting with "state" can have access rules that differ from those for the branch starting with "region". Access rules assigned to a node can be inherited by the children of that node. Access rules can also be non-inherited and so be only applied to an individual node.

Parent inherited access rules generally supersede the rules of nodes lower in the taxonomy hierarchy but this can be disabled. Another available approach is that the most restrictive combination of rules is used. Thus rules can also be structured in a taxonomy hierarchy.

In addition to stating which nodes in a tree structure can be accessed, the conclusion for a rule can contain procedural code, to generalize the content at a node. For example, depending on the premises of the access rule, for a zip code node a script can specify that that the lower decimal places be omitted.

The rules as to what data is suppressed do not just take context information and use it in a premise to determine what level of node can be accessed, but must also take into account the data from other nodes that is to be released. This is because multiple data items in relation to each other can reveal more than the data items processed separately. Therefore, if data types A, B, and C may potentially be released together, then A, B, and C can be placed into a function which indicates their joint sensitivity in real time. If the determined sensitivity is not acceptable, then the parent of each node can be selected for combination with the other child and parent nodes in order to find a combination that has an acceptable level of sensitivity. If an acceptable level is still not found, then ancestors further up the tree can be included in combinations with other nodes. This should be performed in a deterministic way so that a repeat query does not reveal the other data items. This can be accomplished by recording exactly what is returned to a program so that future queries can return the same data items.

Figure 7:
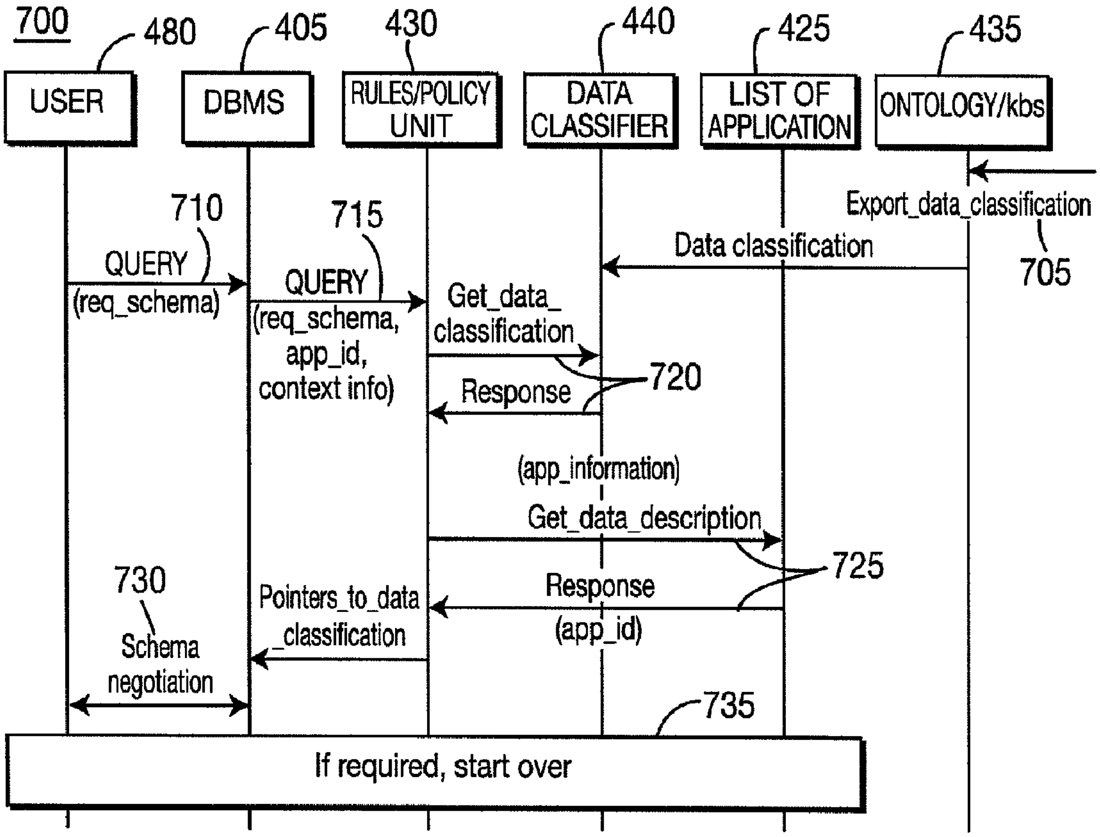
FIG. 7 is a flow diagram of a process for interaction among an embodiment of a database system.

FIG. 7 is a flow diagram of a process for querying a database using the database management system 400 of FIG. 4. At step 705, during startup, data classification description is provided within the ontology/KBS classification unit 435 and is transferred to the data classifier 440 by way of the list of applications 425. The data classification unit 435 builds data classifications as per the ontology provided. At step 710, a user 480 issues a query to the DBMS 405 with the requested schema. For example, this request may include requirements such as, "get all patient records with high blood pressure living in Pennsylvania".

Next, the DBMS 405 analyzes the query and determines the information available for each record in the database. For the example above, this may include such fields as name, street, city, zip code, state, gender, symptoms, medications, hospital, or doctor. The DBMS 405 sends these details to the rules/policy unit 430, at step 715. Also at step 715, the DBMS 405 sends the application id and any other context information provided by the user 480.

The rules/policy unit 430 gets the data classification from the data classifier, at step 720. This step includes sending a get_data_classification message to the data classifier 440 and receiving a response. Then, the rules/policy unit 430 gets the application details from the list of applications 425, at step 725. This step includes sending a get_app_description message to the list of applications 425, and receiving a response.

The rules/policy unit 430 then processes the schema details sent by the DBMS 405, and the rules defined by DBA. The rules/policy unit 430 analyses the rules based on application details and decides some actions. For example, the rules/policy unit may suppress certain fields such as actual name or doctor information, or the rules policy unit 430 may combine information fields such as street, city, and zipcode into regions (for example eastern United States). The schema to be returned may look like [male/female; PA region, symptoms and medications]. At step 730 the rules/policy unit 430 returns this information to the DBMS 405. The DBMS 405, on receiving the revised schema, may negotiate with the user 480, at step 730. If the user does not agree, it may be required to provide more details and context to get some more specific information, and the process may be started over again, at step 735.

The details on the above query and query negotiation procedure set forth above will be described in greater detail hereinafter. As a service to the user, the DBMS can indicate in the response to a query, which data values appear in one taxonomic representation but not the other. This conflict in the access of data can be suppressed by not allowing one representation to override the restrictions of another representation. In addition, a particular application can be restricted to using a subset of the available taxonomy structures.

A query can specify which taxonomic structure that should be used, or alternatively, the data can be returned structured in multiple ways. Each taxonomic structure, in addition to allowing for data access to be based on generalization, can have useful meaning for the accessing application. The database can also merge the different representations into one structure (which may result in the partial redundancy of some nodes) to show all the possible links of nodes resulting in a more generalized ontology.

A security description language can be used to describe and exchange query between the DBMS 405 and the rules/policy unit 430. An application will preferably base its interactions with another application on a predefined interface. For example, a programmer working on a program that will be accessing a web service can retrieve the web services description language representation of the API of the web service. A programmer working on an application that will be accessing a generalized/suppressed database will probably want to know in advance what identity/context the program will need to present to the database in order to be able to retrieve or store a certain field (as represented by a node in a taxonomic hierarchy).

For the purpose of privacy, a program can be restricted from retrieving the values of certain data fields or even being made aware that certain data fields exist. To account for the ability to accurately and truthfully supply values to data fields, a program can be restricted from storing the values of certain fields. It is also possible that a program can store the value for a field, but then not be allowed to retrieve it.

This security description language can be an extension to any language that gets or sets values such as WSDL or SQL.

This security description language is based on the logic of IF-THEN rules, where certain premises concerning the context, including the identity of a user or device, determines the conclusions of what data can be accessed, such as in terms of generalization and suppression. Some representations for a security description language can be IF-THEN rules with boolean terms or an extension to a rights expression language. All or parts of the language can make use of XML.

A query can make a top level request at a node by making a wildcard query. The generalized/suppressed database would then retrieve the values for all the child nodes that the program is allowed to receive. Since the nomenclature of nodes under any parent node can vary, the response to a query would need to include the name and structure of the returned data. This can be done by placing the data in a structure of XML elements. Alternatively, the data can be returned in multiple tables that are preceded with a schema that relates the tables.

Figure 8:
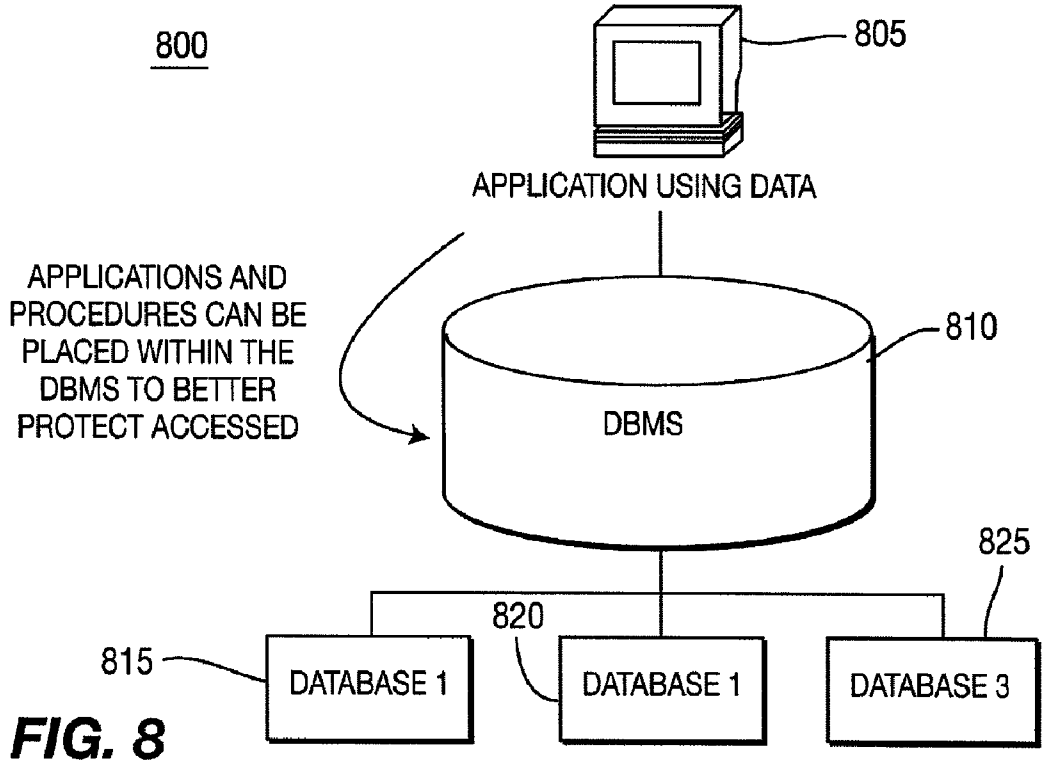
FIG. 8 shows a simplified block diagram of a database system.

FIG. 8 is an embodiment of a generic database system 800. The system includes an application 805 using data, a DBMS 810, and three data generic databases 815, 820, 825. The application is linked to the DBMS 810 and may send queries for data stored in at least one of the three data bases 815, 820, and 825 to the DBMS 810. The DBMS 810 may be located in a network, a WTRU, or other computing platform. The DBMS 810 uses a rules/policy unit (not shown) to determine whether to provide the requested data to the application 805. If the DBMS 810 determines to provide the data, the DBMS 810 will obtain the data from at least one of the three databases 815, 820, 825 and provide it to the application 810.

Figure 9:
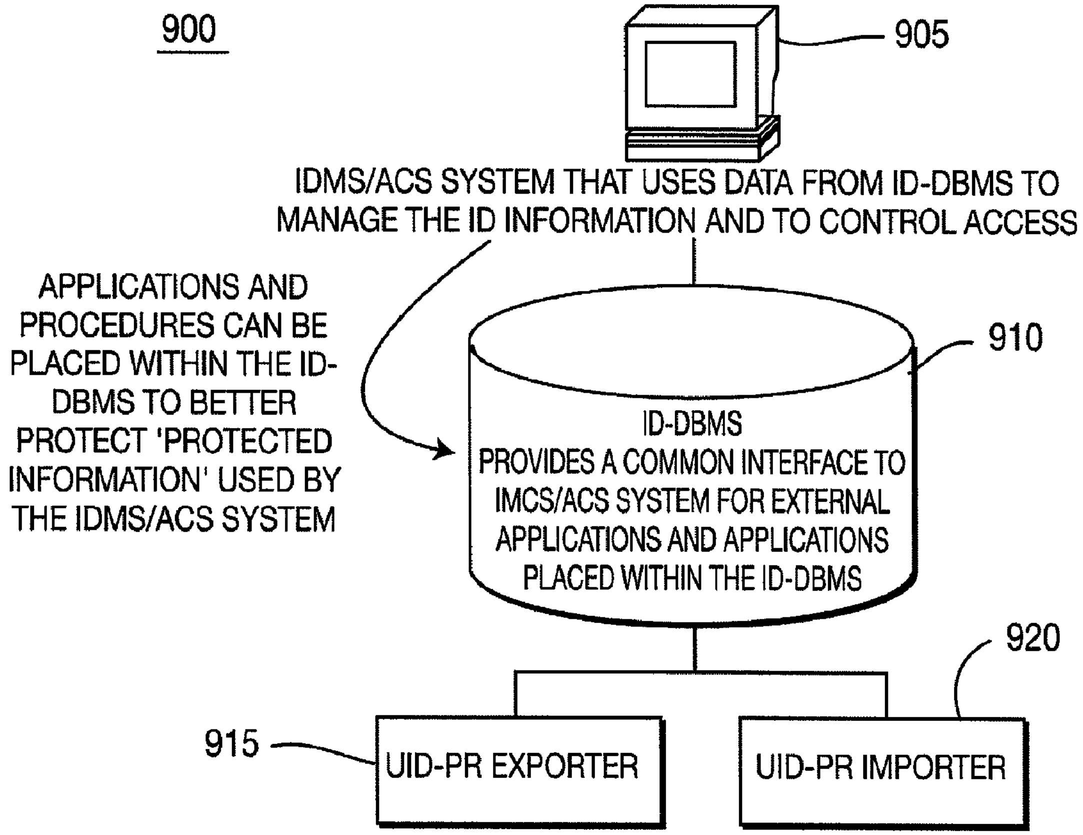
FIG. 9 shows a simplified block diagram of a database for user ID management.

FIG. 9 shows an example of DBMS residing within a communication network which can be used to organize data related to the identity (ID) of a user of a device, as identified by the operator of the communication network wherein disclosure of particular aspects of the user ID (UID) data can be limited under the control by the network operator in control of the DBMS. This specific implementation of the DBMS is hereinafter referred to as the ID-DBMS. Specifically, FIG. 9 is a block diagram of a database system 900 including an ID management and service access controller system (IDMS/ACS) 905, an associated ID-DBMS 910, a UID profile (UID-PR) exporter 915, and a UID-PR importer 920.

In accordance with the embodiment of FIG. 9, the ID-DBMS may maintain a database including the following parameters: UID; user associated devices (UADs); user associated service providers (UASPs); user associated service (UAS); user associated service context (UASC); user associated operator' (UAO); user associated ID service provider' (UAIDSP); user-associated operator billing and charging service (UAO-BCS); user ID information disclosure type and rule (UIIDTR); user-associated access control mechanism information' (UAACMI); UID-PR; and user-ID entity trust mechanism information' (UID-ETMI).

A UID should be unique to the user. Additional relevant information can be associated to each UID and managed by the ID-DBMS 910. Examples of such information may include: a user's name, job title and organization, email address, International Mobile Subscriber ID (IMSI) or Temporary Mobile Subscriber ID (TMSI), or any other information which is unique to the user. Additionally, the UID may include secret information that is not meant to be exposed externally or even to the user but can be used to authenticate a user, such as biometric data, or authenticating tokens. Relevant associated information may include the UIDs of individuals who a user with a given UID is associated to or affiliated with, and contexts of such association or affiliation, including spouse/friends/family-relationships, etc.

A UAD may be used to identify, one or more mobile or fixed communication devices that are associated with a UID. For each UAD, information such as the device type, device capability, model name, serial number, service tag number, and any other relevant information, may be associated to the UAD and managed by the database system.

A UASP may be used to indicate for each user with a given UID (and/or for each combination of a given UID and a given UAD), one or a number associated service providers. Information on UASP may include, but are not limited to, the name, address, and phone numbers and other contact information.

A UAS may be used to identify one or a number of services associated with a user having a UID. The UASs are maintained in the ID-DBMS 910. For each UAS, UASC information as to when, where, and how a particular service can or should be provided, and by what UASP, to a particular UID and/or UID/UAD and/or UID/UAD/UAS combination, may be associated to a given UID, and managed by the database system 900. Examples of such UASC information include specific locations and/or date and times when a particular service can be provided to a particular device or user. Other examples of such UASC information also include specific organizations to which a given UID or a UID/UAD or a UID/UAD/UAS combination can be provided for a particular service or UASP.

A UAO may be used to identify an operator associated with a particular UID. For each UID, and possibly in conjunction with particular combinations of UID/UAD, a number of fixed and/or mobile operators providing communication services and ID management and administration services to the user with a given UID may be associated to each UID and managed by the each operator.

A UAIDSP may be used to identify a provider of ID-related services, including ID-database management services, to the particular UID's UAO, to perform ID-related functions and roles that a UAO may typically perform. Examples of UAIDSPs may be an ID provider, in the context of federated ID systems such as the Liberty Alliance or Internet 2-Shibboleth that may work for a particular UAO, or an ID provider that belongs to a particular network operator and serves queries about the ID of an end user from other network operators, service providers, or other UAIDSPs. A UAO that performs all or part of the functions related to managing the UIDs and related information for itself is simultaneously a UAIDSP. Also, some UAIDSPs may be pure third-party providers of services related to ID management for customer UAOs.

A UAO-BCS may be used to identify associated billing and charging service entity associated with a user. For each UID, and possibly in conjunction to particular combinations of UID/UAD, or UID/UAD/UASP, or UID/UAD/UASP/UASC, the operator must also manage administrative services for billing and charging of communication and convenience services provided to the user. A counter-part billing and service entity within a UASP may be called, for the purpose of this disclosure, a UASP-BCS.

A UIIDTR may be used to provide a mechanism whereby information associated with a given user may be categorized, stored, managed, and, in certain situations such as roaming and billing and services transactions, exchanged. A UIIDTR may specify that the information associated with a given UID may be categorized as a public, protected, and private part of a given UID. Public information can be exchanged between UAO's without restriction, while protected information can be exchanged between UAOs but such information must be cryptographically protected in transmission and storage. Private information may not be exchanged between UAOs without specific reference approval by either government regulation or by explicit consent by a user. Private information, when exchanged, must be protected information. Multiple grades of privacy categories are also possible, where each of the categories of public, protected, and private has more than one grade, for each of which a particular information-disclosure rule may apply.

A UIIDTR is typically devised, managed, and controlled by a UAO, typically with service-level agreement consent from the user who has a given UID. A UIIDTR defines what constitutes public, protected, and private information associated with a given UID. A UIIDTR also specifies what mechanisms may be used and in what contexts, to transfer public or protected information for a user with a given UID, from a UAO to another UAO or UASP, or from a UAO-BCS in a UAO to another UAO-BCS in another UAO or to a UASP-BCS in a UASP. A UIIDTR must specify that a user's private UID information must stay with the UAO or its UAO-BCS, and shall not be transferred to another UAO or its UAO-BCS, or a UASP or its UASP-BCS, unless in government-regulated contingencies (such as under subpoenas) or explicitly approved by the user with the UID. A UIIDTR should also specify what constitutes, for 3GPP and 3GPP/IMS context, the two different User Identities identified by 3GPP/IMS and are used for identification of a user and his/her registration and authorization.

A UAACMI may be used as a mechanism for access control, including authentication and authorization, by a user with a given UID to a UAO, UAO-BCS, a UAS provided by a UASP, or UASP-BCS. Different UAOs, UAO-BCSs, UAS provided by UASPs or UASP-BCSs, may have different mechanisms for access control for a given user with a given UID, UID/UAD combination, or a UID/UAD/UAS combination. The convergence of mobile networks, fixed networks, and UMA/GAN networks in FMC require different accesses for the users' identifiers. Therefore, administrators or operators may require common user identifier platforms to provide registration and authorization to the user regardless of the access mechanisms or terminals being used.

The UID-PR is a data set for a UID that may include a composite of any of UID, UAD, UASP, UAS, UASC, UAO, UAIDSP, UAO-BCS, UIIDTR, or UAACMI. The ID-DBMS 910 manages the ID-related data that may have the characteristics listed above. Optionally, UID-PR may also include a UID-ETMI which provides information for trust-relationship establishment and management, including those for self and/or remote platform attestation, local and/or remote platform integrity measurements, reporting, collection, storage, verification, and lifecycle management, as applied to the entities contained in the rest of the UID-PR.

In addition to implementing and operating an ID-DBMS that features the characteristics and functionalities listed above, the ID-DBMS 910 should also implement security and trust enhancing functions in managing its UID-PRs. For example, the ID-DBMS 910 manages its ID database such that it can be used to control the access to items within a dataset associated with a UID, based on the context restrictions specified in a UAACMI. Mutually cooperating ID-DBMSs may allow access-control permissions and information used in access control, such as log-in credentials and keys, for a particular UASP or UAS, for a given UID or UID/UAD or UID/UAD/UAS combination, to be repackaged so that these items can be more easily indexed using DBMS technology, to facilitate ID-related information exchange between different UAOs serving as ID providers.

The context restrictions must be supplied to the ID-DBMS 910. This can be done in a similar manner to the updating of virus signatures for an anti-virus scanning program, for example. This may involve the updated context restrictions being digitally signed by the sending ID-DBMS 910. The administrator of the ID-DBMS 910 can specify fields that can be added to the base schema. A single table, or possibly multiple tables for a relational ID-DBMS, are automatically instantiated from the schema. When the context restrictions and permission allowances are updated, the schema and corresponding table or tables are automatically updated. Placing columns for all possible context constraints in the table creates a common structure for all UAACMI data so that all relevant permissions can be returned when a search is performed for UAACMI's that are in agreement with the current contextual environment.

TABLE 1

Example ID-DBMS Table at UAO 'Verizon Wireless', for the two users 'John Doe' and 'Jane Doe', after receipt of UID-PR from 'Cingular'

| UID | UAD | UAO | UASP | UAS | UAACMI 'location' and 'time' | UAO-BCS 'billing' information | UID-ETMI |
|---|---|---|---|---|---|---|---|
| John Doe | Motorola Mobile PDA with S/N 10001 | Verizon Wireless (Home UAO) | NY Mobile Video | Streaming Video at 384 kbps or below | In New Jersey, Daily between 18:00-23:59 | $0.14 per minute | |
| John Doe | Motorola Mobile PDA with S/N 10001 | Verizon Wireless (Home UAO) | National Music Service | Streaming Music at 256 kbps or below | In Mid-Atlantic States | $0.10 per minute | |
| John Doe | Mobile PDA with S/N 10001 | Cingular | NY Mobile Video | Streaming Video at 384 kbps or below | In Philadelphia | $0.15 per minute | |
| Jane Doe | Company Issued Mobile Phone with S/N 7882 | Verizon Wireless (Home UAO) | Premium Enterprise Services | Video Conference at 768 kbps | In New Jersey | $0.25 per minute | |
| Jane Doe | Company Issued Mobile Phone | Cingular | Premium Enterprise Services | Video Conference at 1024 kbps | In Philadelphia | | Mobile TPM Certificate for UAD 'Company |

TABLE 1-continued

Example ID-DBMS Table at UAO 'Verizon Wireless', for the two users 'John Doe' and 'Jane Doe', after receipt of UID-PR from 'Cingular'

| UID | UAD | UAO | UASP | UAS | UAACMI 'location' and 'time' | UAO-BCS 'billing' information | UID-ETMI |
|---|---|---|---|---|---|---|---|
| | with S/N 7882 | | | | | | Issued Mobile Phone with S/N 7882' |

Table 1 is an example of a table created by the ID-DBMS.

Alternatively, Table 1 can also be set up as ordinary relational databases upon which an ordinary SQL SELECT statement can be applied. The ID data and table illustrated above can be used in facilitating not only roaming in geographical sense but other handovers such as handovers of access network types, network operators (within same type of access networks), service providers, or even services provided by the same UASP.

The ID-DBMS 910 acting as a supervising controller for an IDMS/ACS 905 may provide the information received from a query to the IDMS/ACS 905. A reserved phrase in the SQL SELECT statement, can be used to indicate to a SQL post-processor (not pictured) that the returned results should be forwarded to the IDMS/ACS 905. The ID-DBMS 910 collects, manages, processes, and stores ID-related information obtained from either internal or external sources such as the UID-PR exporter 915 and the UID importer 920.

Although some of the interactions that an IDMS/ACS 905 may have with the ID-DBMS 910 may be covered by SQL search processors (not shown) in their procedures to retrieve data from the ID-DBMS 910, other types of interactions may be integrated with such a system. For example, data from a UID-PR may also be allowed to flow under the control of the ID-DBMS 910 from the IDMS/ACS 905 to another IDMS/ACS in a protected way. The use of protected information typology, applied to the whole of the data set, may be used for such purposes. The ID-DBMS 910 may provide primitives for such controlled interactions. Such primitives can be used within a scripting language which is placed with the ID-DBMS 910 itself or can be called from within a coordinating application external to the ID-DBMS 910.

Figure 10:
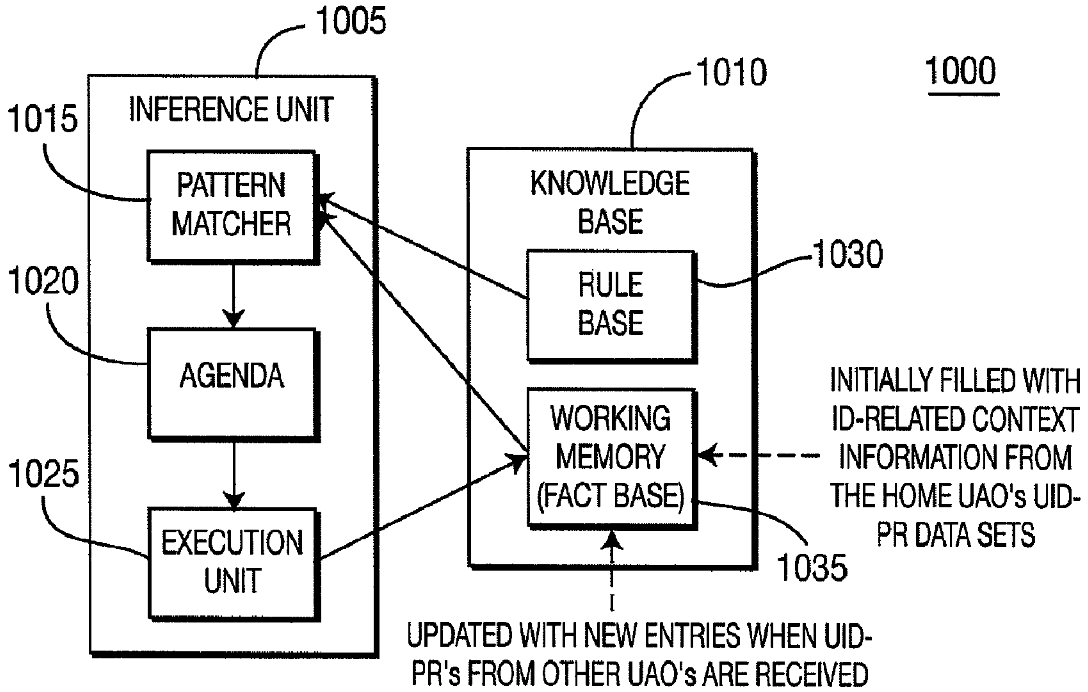
FIG. 10 shows a rules/policy unit for use in an ID-DBMS.

FIG. 10 shows a rules/policy unit 1000, for use with the ID-DBMS 910 of FIG. 9. The rules/policy unit 1000 includes an inference unit 1005 and a knowledge base 1010. The inference unit 1005 includes a pattern matcher 1015, an agenda unit 1020, and an execution unit 1025. The knowledge base 1010 includes a rule base 1030, and a working memory 1035.

The rules/policy unit 1000, will decide based on the working memory 1035 which is filled with context information, which rules apply when. Data supplied will be automatically entered into the working memory 1035 and sent to the pattern matcher 1015. The agenda unit 1020 will then determine the order in which rules should be fired. Thus whereas, SQL typically returns an unordered list (or with basic sorting) of rows which match the SELECT statement's WHERE clause, a rule engine approach can place an order on the returned rows. An integration of this rules/policy unit 1000 functionality into a DBMS can provide proper order to the processing (performance) of the accessed data.

The rules/policy unit 1000 can either be incorporated within the ID-DBMS 910 or may be located separately. The rules/policy unit 1000 incorporates UID related data from the ID-DBMS tables and extracts, interprets, and synthesizes rules for ID management and access control to be used by the IDMS/ACS 905. The pattern matcher 1015 determines, based on the working memory 1035 filled with context information, which rules should apply in terms of access control for a given UID with all of its UID-PR information. Context information can also be supplied by an ID-Context sensing mechanism, and automatically entered into the working memory.

The rules/policy unit 1000 can also allow for the UID-PR description to be simplified. If one rule based on the current context allows for a certain access permission to be allowed, then this fact can be added to the working memory 1035 of the rules/policy unit 1000. Other rules can then use the allowed permission as one of their premises.

Figure 11:
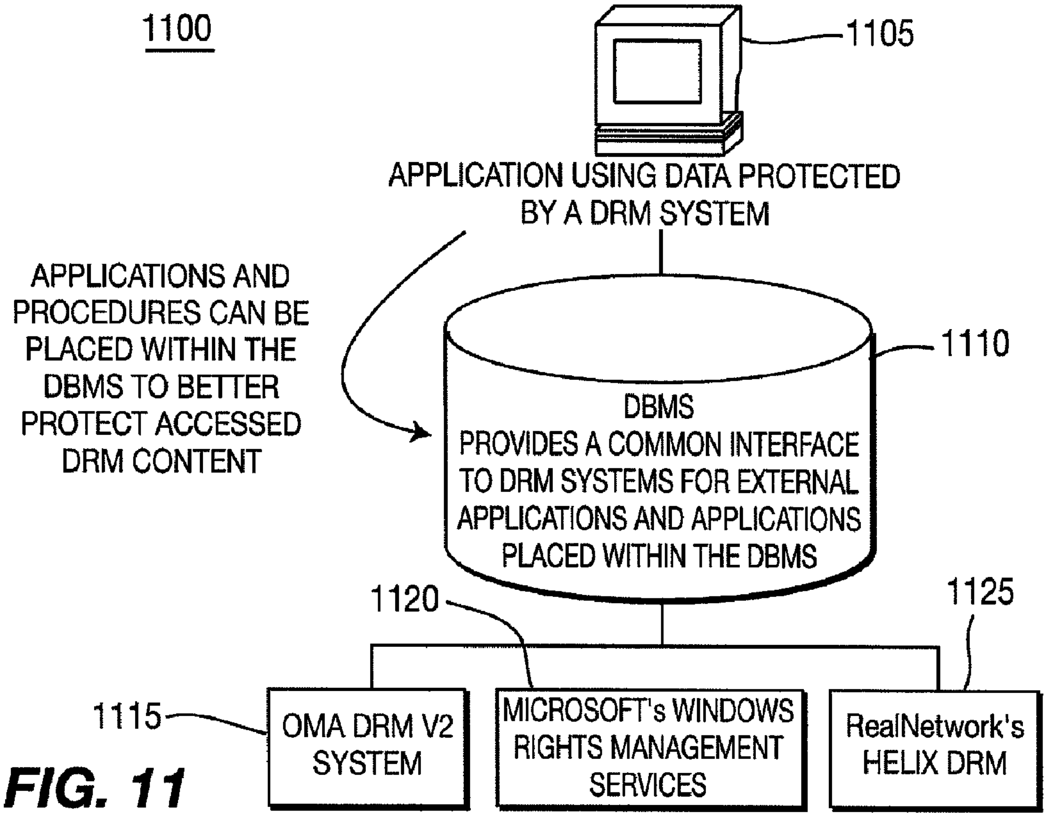
FIG. 11 shows s simplified block diagram of a database for DRM user agent management.

FIG. 11 shows an exemplary embodiment of a database system 1100 configured for storing and protecting DRM content. The system includes an application 1105 using data protected by a DRM system, a DBMS 1110, and three databases which act as DRM user agents 1115, 1120, 1125. The three DRM user agents include OMA DRM v2 1115, Microsoft's windows rights management services 1120, and RealNetworks's helix DRM 1125. These DRM user agents 1115, 1120, 1125 are provided as an example, however, the scope of this embodiment would include a multitude of various types of DRM user gents, each corresponding to a different DRM system, and each with its own type of DRM content files and associated usage licenses.

The application 1105 may be located in a computer, or in a WTRU. Alternatively, the application 1105 may be located in the DBMS 1110. An application located in the DMBS 1110 allows for the DRM protected data to remain within the trusted DBMS 1110. The internal application also allows for the DBMS 1110 to monitor the executing logic of the application. Finally, the internal application also allows for the DBMS 1110 to exert some administrative control on what is allowed to run within it.

If an application 1105 is not placed directly within the DBMS 1110, then trust in the application 1105 can be gained in other ways. One basic technique is for a hash to be taken of the code that is being evaluated, for comparison with an expected value. The TCG has greatly expanded on this basic idea so that software running in different compartments on a platform can be trusted. There can be many topologies involving these compartments. However, one topology of placing the DBMS 1110 and the DRM user agents in the same compartment can result in these software components having a mutually trusted integration. Applications placed in the same compartment as the DBMS 1110 or in separate compartments can gain the trust of the DBMS 1110. Various rendering applications can be placed in a separate compartment. The same may be true for a graphical user interface that can allow a user to interactively manage the use of DRM protected data.

Some of the interactions that the 1110 DBMS can have with a DRM system includes the ability of an SQL postprocessor to forward retrieved COs to the DRM systems based on an ordering of COs. However, this interaction must be tightly coordinated. For example, music protected by one DRM system may need to start to play at a certain point in a video stream protected by another, or the same, DRM system. At a call processing center, data displayed on the operator's monitor that is protected by one DRM system may need to be coordinated with data that is processed and logged by another DRM system. Data may also be allowed to flow under the control of the DBMS 1110 from one DRM system into the protection of another DRM system.

The DBMS can provide primitives to control this interaction. These primitives can be used within a scripting/coordination language which is placed within the database or can be called from within a coordinating application external to the DBMS. It is also assumed that a coordinating application will rely on data items included in the COs that can facilitate a form of synchronization.

The functionality offered by a DRM system is preferably accessed through a common DRM interface using the following techniques. First, if the DRM system only makes available a graphical user interface for using its functionality, then the common interface will need to emulate the actions of a person who is interacting with the GUI. This can use some of the same techniques that are used by test programs to test the operation of a GUI. The GUI selections can thus be converted into an equivalent command line interface or API. Second, if the DRM system provides a command line interface or API, then the common interface can use these commands or API. The API provided by the DBMS may act as a standard to which DRM systems will conform, or a standards organization may allow for a common API to be developed by all parties. Third, the DRM commands for different systems can be mapped into common commands. This may involve accepting the lowest or a lower common denominator of functionality. Some of the basic commands will mirror the permissions indicated in the RO such as print or display. In general, however, performing a permission procedure can involve parameters which are of no relevance for a RO. These common commands are the performance primitives.

Figure 12:
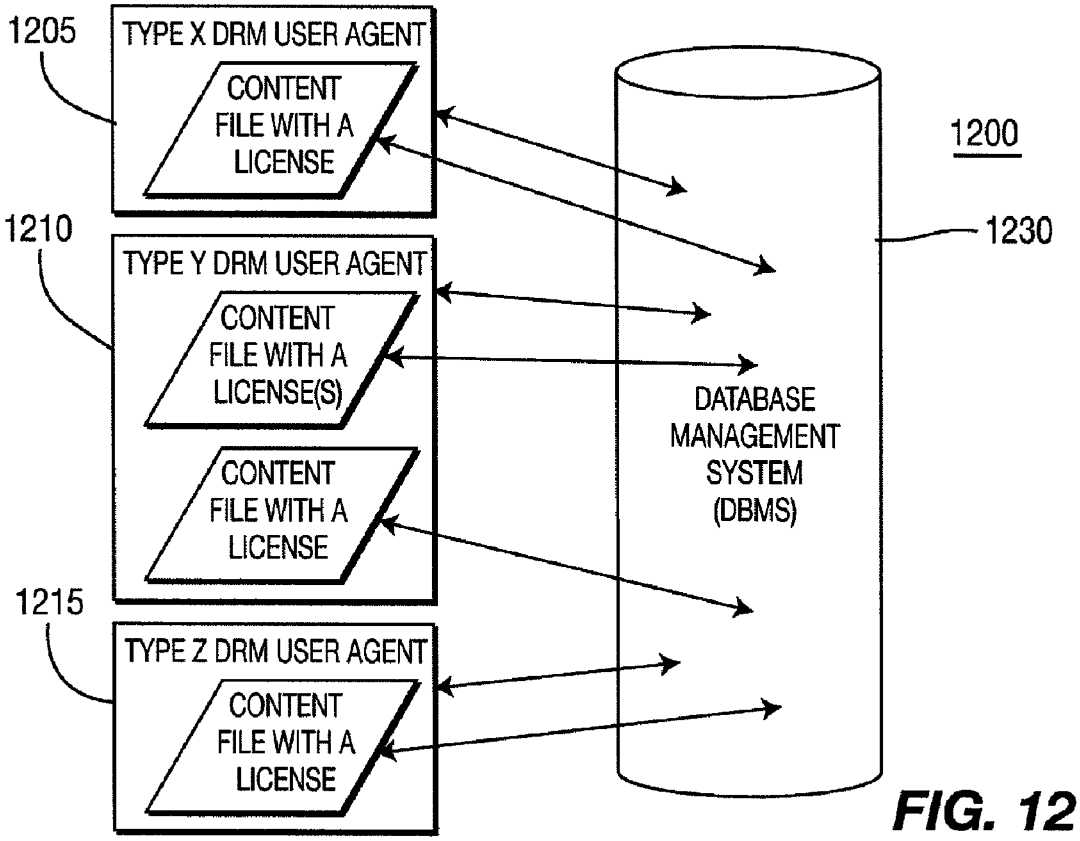
FIG. 12 shows relationships between various DRM user agents and a DBMS.

FIG. 12 shows another embodiment of a database system configured for use in a DRM type system. Specifically, FIG. 12 shows the relationships between various DRM user agents 1205, 1210, and 1215, their content and a DBMS 1230. The aspects of a DRM system that will be related to a DBMS 1230 in the embodiment of FIG. 12 are a content file (contains content objects), a license (also called a rights object), and a DRM user agent.

The content file may comprise multiple units of user data that are fairly self-contained. Each of these units will be called a content object (CO) using the terminology of OMA DRM. The license can be physically associated with a CO, or be logically associated with a CO where the license has a field that identifies the related CO. A CO may have multiple licenses. In the terminology of OMA DRM, a license is called a rights object (RO) and this terminology will also be used here. The DRM user agent controls the processing of the CO based on the RO.

To achieve more effective and efficient access to COs with a DBMS, the access procedure can directly involve the COs, the ROs, the DRM user agents, and combinations of these. First the relationship of ROs to a DBMS will be developed.

The ROs associated with COs add the following security protections and restrictions on the use of COs. First, the RO may hold a key that is used to encrypt the CO thus providing confidentiality for the CO. Second, the RO may hold a hash or a digital signature of the CO thus providing integrity for the CO. Third, the RO may specify permissions (play, display) allowed for accessing content and any constraints (time period) imposed on the permissions. For this embodiment, constraints will be placed in two categories: 1) context constraints, which indicate aspects of the environment that need to exist in order for the content to be accessed; and 2) performance constraints, which indicate limits on the rendering, alteration, or distribution of the content. Finally, the RO may also indicate any requirements for performing permission procedures such as the payment of a fee.

The DBMS 1230 may also allow permissions and keys found in an RO to be repackaged so that these items can be more easily indexed using DBMS technology. From the perspective of an author of an RO, this is a reformatting. Since permissions are often stored in plaintext they conducive to this reformatting. As described later for the CO's relationship with the DBMS 1230, efficiencies can be gained by reformatting the CO based on the needs of the DBMS 1230. This degree of change would require the consent of the author of an RO and such consent can be specified up-front as an extension to the RO. There can be various DBMS profiles where a profile can be a particular DBMS product or a particular configuration of a DBMS product. The extensions to the RO can specify if certain changes to the protections maintained by the RO can be made in conjunction with a DBMS profile.

This repackaging of an RO into the DBMS 1230 is illustrated using RO permissions in the flavor of the open digital rights language (ODRL) and a table as may exist in a relational DBMS. The example has two ROs, each of which is associated with different COs.

One RO (ID RO1) for a CO (ID CO123) has the following partial Rights expression language (REL) section.

```
<display>
    <constraint>
        <context>
            <name>Jane Doe</name>
        </context>
        <context>
            <location>in offices of Acme Company</location>
        </context>
    </constraint>
</display>
<display>
    <constraint>
        <context>
            <name>John Doe</name>
        </context>
        <context>
            <location>in offices of Acme Company</location>
        </context>
    </constraint>
</display>
<print>
    <constraint>
        <context>
            <name>Jane Doe</name>
        </context>
        <context>
            <location>in offices of Acme Company</location>
        </context>
    </constraint>
</print>
```

Another RO (ID RO2) for a different CO (ID CO789) has the following partial REL section.

```
<display>
    <constraint>
        <context>
            <name>John Doe</name>
        </context>
```

-continued

```
    </constraint>
  </display>
  <print>
    <constraint>
      <context>
        <name>Jane Doe</name>
      </context>
      <context>
        <name>John Doe</name>
      </context>
      <context>
        <location>in offices of Acme Company</location>
      </context>
    </constraint>
  </print>
```

The above XML REL data is placed in Table 2.

TABLE 2

| RO_ID | CO_ID | permission | name | location | time |
|---|---|---|---|---|---|
| RO1 | CO123 | display | Jane Doe | in offices of Acme Company | blank |
| RO1 | CO123 | display | John Doe | in offices of Acme Company | blank |
| RO1 | CO123 | print | Jane Doe | in offices of Acme Company | blank |
| RO2 | CO789 | display | John Doe | blank | blank |
| RO2 | CO789 | print | Jane Doe, John Doe | in offices of Acme Company | blank |

The DBMS 1230 will automatically create a base schema that includes all of the context restrictions that may be specified in any relevant REL. For a relational DBMS, this base schema will include a column for each possible context restriction as well as for each possible permission allowance. The context restrictions must be supplied to the database and this can be done in a similar way to the updating of virus signatures for an anti-virus scanning program. This may involve the updated context restrictions being digitally signed by the publisher of the DBMS program. The administrator of the DBMS can specify fields that should be added to the base schema. A single table, or possibly multiple tables for a relational DBMS, are automatically instantiated from the schema. When the context restrictions and permission allowances are updated, the schema and corresponding table or tables are automatically updated. Placing columns for all possible context constraints in the table creates a common structure for all ROs so that all relevant ROs can be returned when a search is performed for ROs that are in agreement with the current contextual environment.

If the REL in an RO for a CO does not include a certain context constraint, then the field in that column is left blank. A blank field results in a match with any value for that field specified in an SQL SELECT statement WHERE clause. The CO_ID field is a reference to the CO so that the CO can be accessed. Not shown in Table 1 is a column for the hash or digital signature of the CO and a column for the encryption key for the content which is automatically placed in the table by the DBMS based on fields in the RO. If these fields are common for a given RO/CO, they can be placed in a separate table that is related to the table below using the RO_ID and CO_ID fields as a key.

In Table 2, multiple constraints can be applied to the same column involving a logical AND. Thus both Jane Doe and John Doe must be present for content object CO789 to be printed. This can be handled since the "name" column can take an arbitrary string but extensions to SQL can allow for this case to be handled more elegantly and efficiently.

The table(s) created can be used so far as an ordinary relational database upon which an ordinary SQL SELECT statement can be applied. For instance, the following statement:

SELECT CO_ID, permission FROM DRM_RO WHERE name='John Doe' would return the record set of:

CO123, display

CO789, display

The ordinary use of an SQL query in terms of DRM protected content can be helpful when it needs to be determined (for informational purposes) what context constraints must exist in order for content to be accessed and what performance constraints will exist after the content is accessed.

However, an SQL query when performed as the means to abide by context constraints must provide in the WHERE clause a term for every possible context constraint. These values for the context constraints come from a sensing system (that is largely external to this embodiment) which are fed to the creation of query commands such as an SQL SELECT statement. In some cases, this context sensing system may not be able to properly determine certain context constraints or the end user may not want to reveal certain context constraints, and so not all values of context constraints may be available for the DBMS/DRM system. In keeping with SQL syntax, these unavailable context constraints will be expressed using the NULL value. For the Table 1, if the location and the time are not available, such an SQL SELECT statement will be as follows:

SELECT CO_ID, permission FROM DRM_RO WHERE name='John Doe' AND location IS NULL AND time IS NULL The record set returned would be:

CO789, display

Thus the DBMS/DRM system will only allow John Doe to display CO789.

A preprocessor for SQL SELECT statements intended to restrict access to content based on DRM protections can see which context constraints are absent and automatically add them as NULLs.

The DBMS acting as a supervising controller to the DRM system controller can pass the information received from the query to the DRM system. A reserved phrase in the SQL SELECT statement, can be used to indicate to an SQL post-processor that the returned results should be forwarded to the DRM system. This reserved phrase should also be stripped from the SQL before it is processed as an ordinary SQL statement. The phrase WITH DRM_PERFORM as shown in the following SQL statement can indicate this post-processing step:

SELECT WITH DRM_PERFORM CO_ID, permission FROM DRM_RO WHERE name='John Doe'

The preprocessor will strip the WITH DRM_PERFORM and add the NULL constraints to get the SQL statement specified earlier:

SELECT CO_ID, permission FROM DRM_RO WHERE name='John Doe' AND location IS NULL AND time IS NULL In Table 2, a single column was given for the permission. The REL also allows for the specification of constraints on the performance of a permission which are called here performance constraints. An example of this is that a song can only be played three times. Performance constraints can be combined with the permission in the same column or can be placed in a separate column or be broken out into multiple columns. This allows for an SQL SELECT statement to limit the rows returned or for a filter to be more easily applied to select subsets of the rows returned.

The ROs for different DRM systems may use different terms for similar concepts. The use of an ontology can help to show the relationship between different terms as an aid for mapping to common terms. MPEG-21's Rights Data Dictionary (RDD) has the characteristics of a structured ontology for terms in a Rights Expression Language (REL) and can aid with this mapping.

The rights, such as that expressed in XML above, can be converted into rules of the type that can be processed by a rule/policy unit. For example, it can have the form:

IF name=Jane Doe AND location=in offices of Acme Company THEN OK to display content object CO123

IF name=John Doe AND location=in offices of Acme Company THEN OK to display content object CO123

. . .

IF name=John Doe AND name=Jane Doe AND location=in offices of Acme Company THEN OK to print content object CO789

Figure 13:
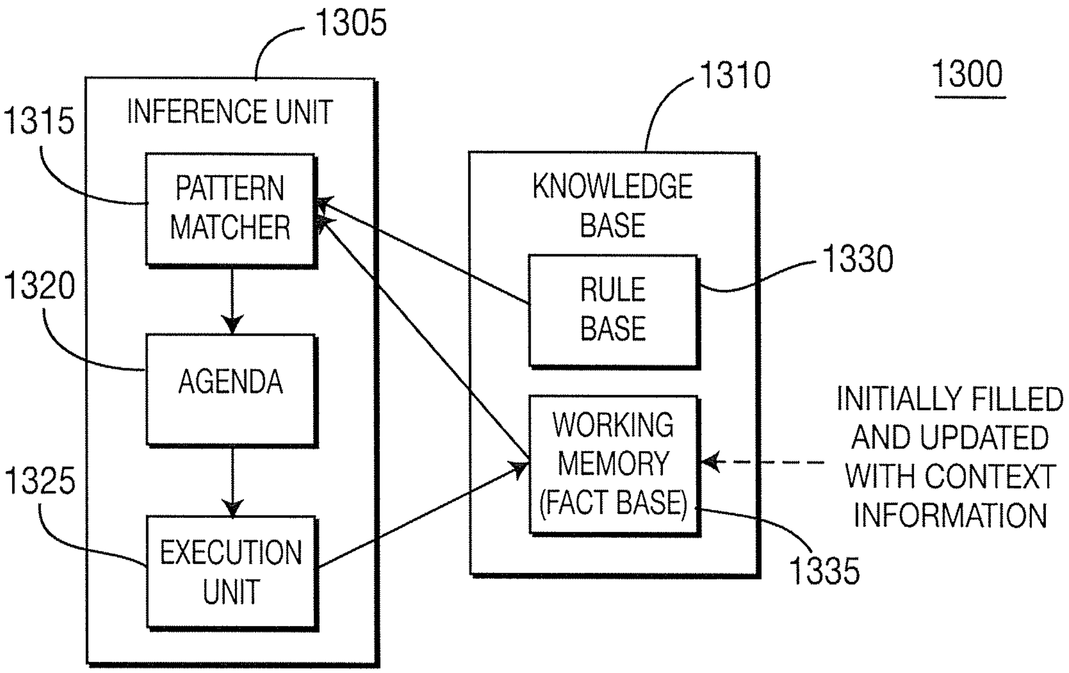
FIG. 13 shows a rules/policy unit for use in DRM applications.

FIG. 13 shows an exemplary block diagram of a rules/policy unit 1300. The rules/policy unit 1300 includes an inference unit 1305, and a knowledge base 1310. The inference unit includes a pattern matcher 1315, an agenda unit 1320, and an execution unit 1325. The knowledge base 1310 includes a rule base 1330, and a working memory 1335 or fact base.

The rules/policy unit 1300, will decide based on the working memory 1325 which is filled with context information including which rules apply when. Context information supplied by a context sensing system will be automatically entered into the working memory 1335. The agenda unit 1320 will then determine the order in which rules should be fired. Thus whereas, SQL typically returns an unordered list (or with basic sorting) of rows which match the SELECT statement's WHERE clause, a rule engine approach can place an order on the returned rows. An integration of this rules/policy unit 1300 functionality into a DBMS can provide proper order to the processing (performance) of the accessed data.

The rules/policy unit 1300 can also allow for REL statements to be simplified. If one rule based on the current context allows for a certain permission to be allowed, then this fact can be added to the working memory 1335 of the rules/policy unit 1300. Other rules can then use the allowed permission as one of their premises. Thus, if a certain CO can be displayed from a projector in a home theater and can be displayed on a mobile phone, then its display on all other display devices can be allowed.

After a RO is processed and the corresponding content is accessed, the DBMS may hand over all processing to the DRM system, including the decryption of the CO. Greater efficiency could be achieved if the DBMS can decrypt the data after accessing the data. A column in one of the tables can contain the key needed to decrypt the content.

Keys can be wrapped various times to protect the key. For instance, with OMA DRM v2, the CO is encrypted with the content encryption key (CEK). The CEK is, in turn, encrypted with the rights encryption key (REK). The REK is, in turn, encrypted with the key encryption key (KEK). The KEK is, in turn, essentially encrypted with the public OMA DRM UA key which requires the corresponding private key to decrypt it. The encrypted CEK is stored under the "asset" element in the RO, and the REK and KEK are stored under the "encKey" element in the RO.

Figure 14:
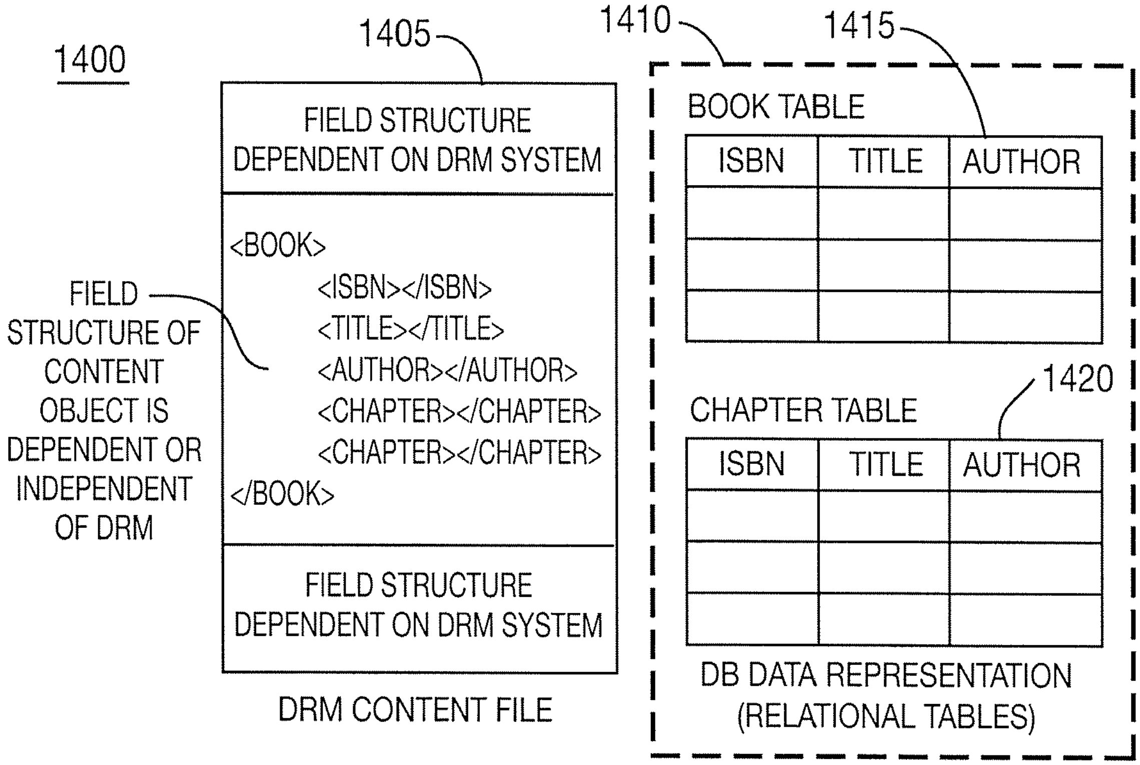
FIG. 14 shows a simplified CO structure which may comprise DRM system dependent and independent fields.

FIG. 14 shows an exemplary structure of a DRM content file, or CO 1405, and its corresponding database representations 1410. The database representations include a book table 1415 and a chapter table 1420.

Both the CO 1405 and the DB representations 1410 have a schema for the logical organization of end user data. It is assumed that the schema of the DB representations 1410 can adapt to the schema of the CO 1405. For CO schemas that are independent of a DRM system, the CO schema can be made to adapt to the DB schema. Standard schemas can allow for greater interoperability between the CO 1405 and DB schemas. In many cases, though, the administrator of a DBMS will receive COs from various sources with various formats and will need to map these to a DBMS.

For the sake of access efficiency, it is preferable that the values in the CO to be placed in their respective cell in the table. This is not entirely necessary as each row can essentially have a pointer to the CO that will need to be accessed and decrypted as it is needed. The CO in this case is not considered to be residing within the DBMS. An alternative is that the DB table only has select columns populated so that desired rows can be efficiently selected (using an SQL query) for further population of data by accessing the CO. The REL extension specifies which fields in a CO can be copied from the CO and placed in a DBMS for the purpose of efficiently querying the available data.

Data from COs with different fields can be commingled in the same table if allowed by a REL extension in the associated ROs. This can allow for the more efficient access of related data. The data on a row belonging to one CO can be encrypted with a different key than the data belonging to another CO. For efficiency it would be better for all of the data on a row, or for the entire table, to be encrypted with a single key as described earlier.

Fields in different structured COs may have different terms which are either synonyms or relate to each other in a hierarchical manner. Understanding these relationships may help map the terms in COs to terms in the database. For instance, a field of "mother" in a CO may map to a field of "person" in the database. The use of an ontology may be an aid to the DBMS administrator in specifying these links or may allow for an automated mapping, particularly if the DBMS is based on an ontology.

Typically with a DBMS, an administrator has a large amount of control as to what data can be found in the database. For instance, an application program performing payroll can assume, to a large degree, that a record will exist for each employee and that each record will contain data in all of the fields that are needed to compute the payroll.

With DRM protected data, the situation of the creator of the data being in control of the data is more likely. This control can be manifested in the permissions or restrictions in the RO associated with the CO, in which case an application may need to adjust its processing so that a greater representation of the needed data is available for processing, i.e., the more permissions or fewer restrictions that an application requires the less data may be available to it.

In another embodiment, a database system stores DRM content using CTC. CTC uses a common ciphering algorithm to re-encrypt different content objects originally adhering to different DRM systems with different encryption/decryption algorithms, such that all downloaded contents can be reciphered using a common ciphering algorithm, and then stored in one format. Later, the same common ciphering algorithm can decrypt such content for further playback or other use. A DBMS system that employs CTC, is able to store all downloaded content with the same, common ciphering scheme, and implement a common security level for the storage and use of all downloaded contents. Better efficiency of ciphering computations by use of a single, 'highly optimized' algorithm, is another benefit of such a scheme.

Figure 15:
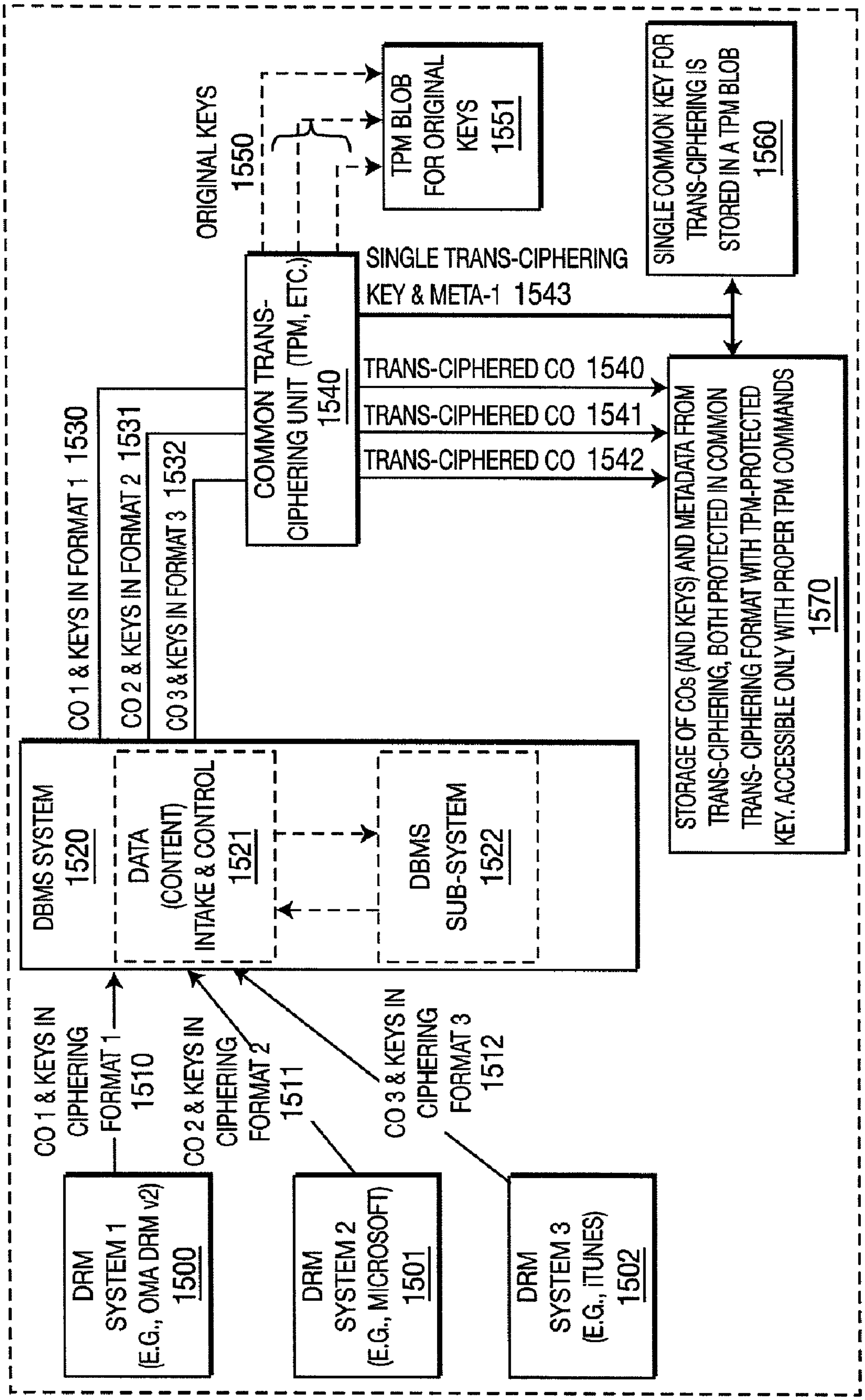
FIG. 15 shows the DBMS using CTC to trans-cipher DRM contents downloaded using different DRM systems, and then securely store the trans-ciphered CO data.

FIG. 15 depicts an embodiment of a database system for securely and efficiently storing content and related meta data from different DRM systems. The system includes three different DRM systems 1500, 1501, 1502, a DBMS 1520 including a data intake and control unit 1521 and a DBMS sub-system 1522, and a CTC unit 1540.

The CTC unit 1540 generally comprises a TPM (not pictured) and a crypto unit (not shown) which has been optimized for CTC. The DBMS 1520 is configured to handle management of multiple DRM content from three different DRM systems.

Each DRM system 1500, 1501 and 1502 outputs a CO and keys associated keys in ciphering format 1510, 1511 and 1512, respectively. The CO 1 and related encryption keys 1510 may be due to a OMA DRM v2.0 compliant DRM system 1500, another content object CO 2 1511 and related keys may be due to a Microsoft DRM system 1501, and finally another content object CO 3 1512 and its related keys may be due to a RealNetworks DRM system 1502. Note that all three DRM systems may use different encryption schemes for content protection. The DBMS system 1520 is shown here as an example comprising two sub-system parts, a content data intake and control unit 1521 and a data management sub-system 1522. Note that functions of such sub-systems can be implemented in a unified system and the division of functions in FIG. 15 is given only as an illustration of an example.

The content data intake & control unit 1521 takes in the three different content objects CO 1 1510, CO 2 1511 and CO 3 1512 as well as their related encryption keys, each encrypted in the respective DRM system's own ciphering format. The CTC unit 1540, which may be a TPM, performs two procedures to separately but securely encrypt, using a common ciphering scheme, and store the original encryption keys and the content data in the common ciphering format. Thus, the original keys 1450 are depicted to be first encrypted using the CTC unit 1540 and then to be stored in a TPM blob 1551. Optionally, additional data that can attest to the integrity of any data, command, or the platform or application, can also be added in the TPM blob 1551 for the keys, ensuring further integrity security protection.

Next, the COs 1510, 1511, 1512 can be separately stored in TPM blobs after having been de-ciphered in each respective decryption scheme and then re-ciphered using the CTC scheme by the CTC unit 1540. The trans-ciphered content object data 1540, 1541, and 1542, are thus depicted as the trans-ciphered outputs according to the original content object 1510, 1511, and 1512, respectively. Note that the trans-ciphering operation uses one, common trans-ciphering key, and is assumed to be fast and efficiently computed. An off-TPM secure storage 1570 using TPM blobs 1551 for the trans-ciphered contents 1540, 1541, and 1542 is also shown. Note that the common ciphering key 1543 and optional meta data is stored in a TPM blob 1560 within the CTC unit 1540, thus being offered the best-in-the-system security protection.

Figure 16:
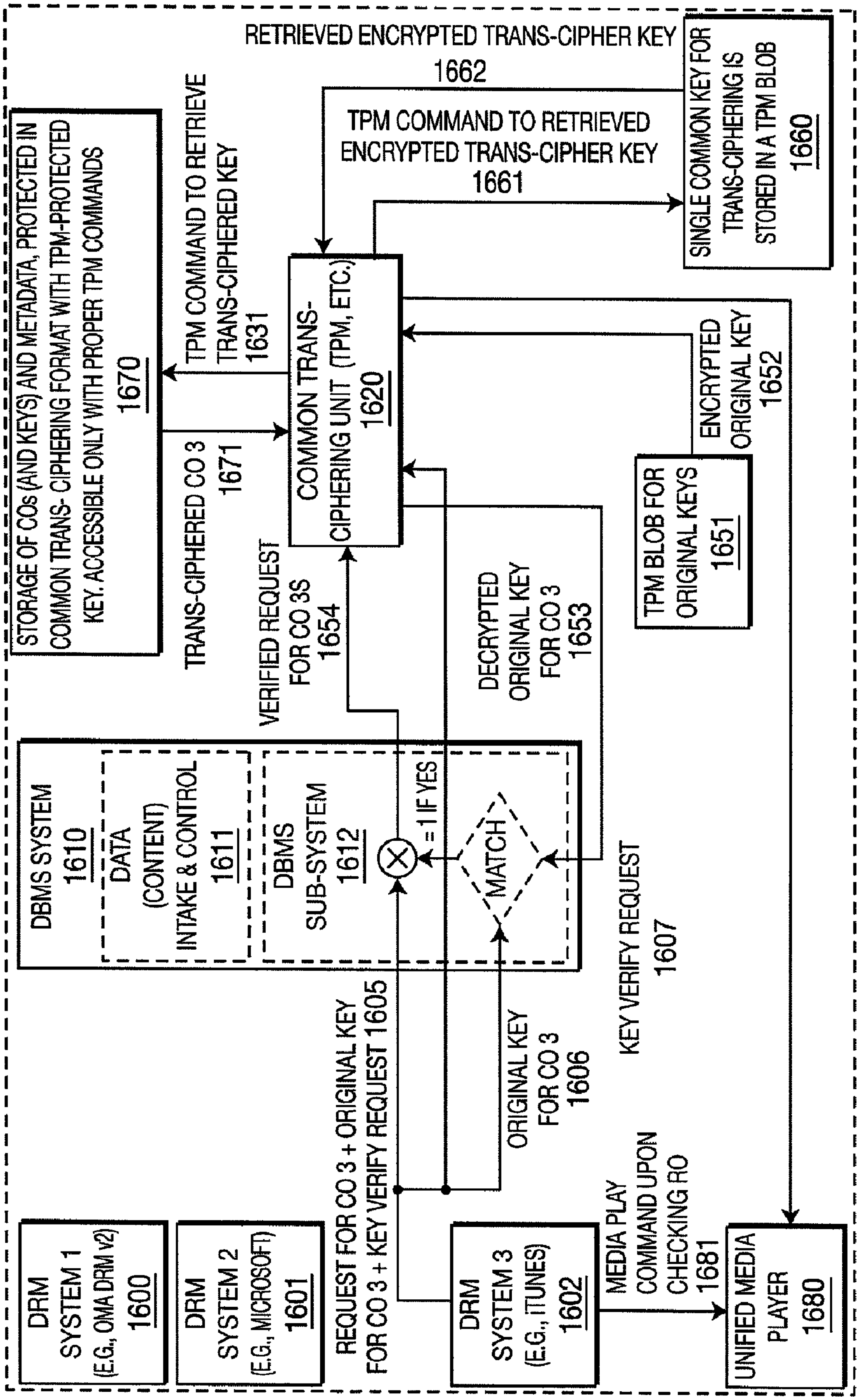
FIG. 16 shows DBMS operations for retrieval and use of CO data that had been securely stored using content trans-ciphering.

FIG. 16 an example of a data base system in which a content object CO 3 that has previously been trans-ciphered and TPM blobs after having been trans-ciphered can now be requested and retrieved by the DRM system 1602 that now wants to use the content data to be played on a media player 1580. The format of the content may also be trans-coded into a single format for simple, single format player functionality. This too would achieve the same efficiencies mentioned for the trans-ciphering engine.

In FIG. 16, the DRM system 3 1602 includes a three DRM systems 1600, 1601, 1602, a DBMS system 1610, and a CTC unit 1620. The DBMS system includes a content intake and control unit 1611, and a DBMS sub-system 1612. The CTC unit includes a trusted processing module (not picture,) and TPM blobs 1651 for storing original DRM keys. The DRM system 1602 provides a request package that includes a request 1605 for a de-ciphered content data corresponding to the CO 3 1512 to the DBMS system 1610. The original decryption keys 1606 that it had received with the CO 3 and have held for the iso-systemic decryption of the CO 3, and a request 1607 for the verification of the keys themselves.

The DBMS data management sub-system 1622 first passes the key verify request 1607 to the CTC unit 1620, which is protected by a TPM, then retrieves the original decryption keys encrypted in common trans-ciphering format 1652 from the TPM blob 1651 that has held the data. The CTC unit 1620 then de-ciphers the encrypted original keys and passes them 1607 to the DBMS data management sub-system 1622. The sub-system then compares the keys 1606 supplied from the request package from the DRM system 3 1602, and the keys 1653 it received from the CTC unit 1620. If they match, the request for the content object for the CO 3 itself 1605 is considered verified, and the verified request for the data 1654 is passed to the CTC unit 1620. The CTC unit 1620 then issues a command 1661 to retrieve the common trans-ciphering key 1662 from a data 1660 it had stored within itself. After the retrieval of the common trans-ciphering key 1662, it issues a command 1631 to retrieve from a previously established TPM blob 1670 the trans-ciphered content data and any metadata for CO 3 1671 that had been previously stored using the common ciphering key 1662. The CTC unit 1620 then deciphers the trans-ciphered content object for CO 3 using the common ciphering key 1662, and sends the now de-ciphered content data and any meta data for CO 3 1682 to the media player.

The DRM system 3 1602 issues appropriate 'media play' command 1681 after checking and interpreting the relevant RO for the CO 3. Upon receiving a secure issuance of such command (of which protection is not described here), the media player can now play the deciphered content data for CO 3 1682.

Although the features and elements are described in the preferred embodiments in particular combinations, each feature or element can be used alone without the other features and elements of the preferred embodiments or in various combinations with or without other features and elements of the present embodiments. The methods or flow charts provided in the present embodiments may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A secure database system for use in a wireless communication system, the database comprising:

a database management system (DBMS) configured to process a data query;

a database coupled to a rules unit for storing at least one data field, and providing said at least one data field to said rules unit upon receiving said data query; and the rules unit configured to receive the at least one data field associated with the data query from the DBMS and context information associated with a use or purpose of the at least one data field, wherein the rules unit is further configured to provide access to the at least one data field if the context information satisfies at least one access rule.

2. The secure database system of claim 1 wherein the rules unit comprises:

a policy unit configured to output a pointer to the at least one data field.

3. The secure database system of claim 2 wherein the rules unit further comprises:

a list of applications allowed to access the policy unit;

an ontology/KBS unit configured to import ontology descriptions of data; and a data classification unit configured to output a data classification for the data query.

4. The secure database system of claim 3 wherein the data query comprises an application data query, and wherein the rules unit is configured to reject the application data query if a corresponding application is not on the list of applications allowed to access the policy unit.

5. The secure database system of claim 2 wherein access to the policy unit is secured by a trusted processing module.

6. The secure database system of claim 1 wherein the at least one access policy comprises a plurality of unique access policies.

7. The secure database system of claim 1 wherein the data query is exchanged between the DBMS and the rules unit using a security description language.

8. The secure database system of claim 1 wherein the DBMS is located in the rules unit.

9. The secure database system of claim 1 the system further comprising:

an application for using and requesting digital rights management (DRM) protected content; and at least one DRM user agent for storing DRM agent specific protected DRM data.

10. The secure database system of claim 9 wherein the DBMS is further configured to receive a request for the DRM protected content from the application and retrieve the requested DRM content from the at least one DRM user agent.

11. The secure database system of claim 9 wherein the rules unit is further configured to receive the request for the DRM protected content.

12. The secure database system of claim 1 the system further comprising:

at least one digital rights management (DRM) system configured to provide DRM encrypted content objects (COs); and a common trans-ciphering (CTC) unit configured to re-encrypt different COs originally encrypted for different DRM systems with different encryption/decryption algorithms and to store the different content objects in a protected memory.

13. The secure database system of claim 12 wherein the DBMS is further configured to receive the COs from the least one DRM system and provide the COs to the CTC unit if the COs satisfy predefined rules and classification requirements.

14. The secure database system of claim 13 wherein the CTC unit further comprises:

a crypto unit configured to perform content trans-ciphering; and a trusted platform module (TPM) unit configured to protect the stored COs.

15. The secure database system of claim 13 wherein the DBMS further comprises:

a CO intake and control unit; and a DBMS sub-system configured to compare the COs to the predefined rules and classification requirements.

16. A database system for securely managing identity (ID) related information for use in access control for a wireless communication network, the database system comprising:

an ID management and service access controller system (IDMS/ACS) for managing access to the wireless communication network based on information contained in a user ID profile (UID-PR);

a UID-PR exporter;

a UID-PR importer;

an ID-database management system (ID-DBMS) configured to provide an interface between the IDMS/ACS and the UID-PR importer and UID-PR-exporter; and a rules/policy unit configured to receive a UID-PR query from the IDMS/ACS and context information associated with the queried UID-PR, the rules/policy unit being further configured to provide a data field from the queried UID-PR if the context information satisfies a context restriction associated with the UID-PR.

17. The database system of claim 9 wherein the UID-PR includes at least one parameter selected from the following list of parameters: user associated device (UAD); user associated service provider (UASP); user associated service (UAS); user associated service context (UASC); user associated operator (UAO); user associated ID service provider (UAIDSP); user-associated operator billing and charging service (UAO-BCS); user ID information disclosure type and rule (UIIDTR); user-associated access control mechanism information (UAACMI); UID-PR; and user-ID entity trust mechanism information (UID-ETMI).

18. The database system of claim 17 wherein the UASC includes information related to a specific location or time when a service can be provided to a particular user.

19. The database system of claim 17 wherein user-associated UAO-BCS is used by the network for billing and charging, and UAACMI is used by the network for access control.

20. The database system of claim 17 wherein the UID-ETMI defines information on mechanisms for trust-relationship establishment and management.

* * * * *